US007095336B2

(12) United States Patent
Rodgers et al.

(10) Patent No.: US 7,095,336 B2
(45) Date of Patent: Aug. 22, 2006

(54) SYSTEM AND METHOD FOR PROVIDING PEDESTRIAN ALERTS

(75) Inventors: Charles E. Rodgers, Saint Leonard, MD (US); Darrell F. Greenlee, Laurel, MD (US); Richard D. Blomberg, Stamford, CT (US)

(73) Assignee: Optimus Corporation, Silver Spring, MD (US)

( * ) Notice: Subject to any disclaimer, the term of this patent is extended or adjusted under 35 U.S.C. 154(b) by 214 days.

(21) Appl. No.: 10/667,896

(22) Filed: Sep. 23, 2003

(65) Prior Publication Data

US 2005/0073438 A1 Apr. 7, 2005

(51) Int. Cl.
*G08G 1/16* (2006.01)
*B60Q 1/00* (2006.01)

(52) U.S. Cl. ...................... 340/903; 340/435; 340/436; 701/301

(58) Field of Classification Search ................ 340/903, 340/944, 426.19, 539.11, 53, 539.13; 701/301
See application file for complete search history.

(56) References Cited

U.S. PATENT DOCUMENTS 4,543,577 A 9/1985 Tachibana et al.
4,549,181 A 10/1985 Tachibana et al.
5,554,982 A * 9/1996 Shirkey et al. ............. 340/903
5,838,237 A * 11/1998 Revell et al. ............ 340/573.1
5,983,161 A 11/1999 Lemelson et al.
6,223,125 B1 4/2001 Hall
6,275,773 B1 8/2001 Lemelson et al.
6,337,637 B1 1/2002 Kubota et al.
6,411,328 B1 6/2002 Franke et al.
6,487,500 B1 11/2002 Lemelson et al.
6,519,512 B1 2/2003 Haas et al.
2002/0101360 A1 8/2002 Schrage
2002/0110261 A1 8/2002 Yanai
2003/0016143 A1 1/2003 Ghazarian
2003/0151506 A1* 8/2003 Luccketti ............... 340/539.13

* cited by examiner

*Primary Examiner*—Donnie L. Crosland
(74) *Attorney, Agent, or Firm*—Cooley Godward LLP

(57) ABSTRACT

A system and method for generating pedestrian alerts are provided. Vehicle operators are provided with alerts regarding potential vehicle-pedestrian collisions and other dangers involving pedestrians. Additionally, pedestrians may be provided with alerts regarding potential dangers, including dangers of vehicle-pedestrian collisions. Mobile devices, which can be carried or worn by pedestrians, respond to activation signals from a vehicular device. The vehicular device receives positional information from each mobile device within transmission range, and determines relative positions of each of the mobile devices with respect to the position of the vehicular device. A determination of the probability of intersection of any mobile device with a warning zone near the vehicular device is calculated and predicted according to pre-determined rules. If the probability of intersection meets or exceeds a pre-determined threshold, an alert is generated.

49 Claims, 25 Drawing Sheets

Note: Boxed numbers indicate distance (in meters) from warning zone.

Note: Boxed numbers indicate distance (in meters) from warning zone.

Note: Average distance from warning zone is 17 meters.

SYSTEM AND METHOD FOR PROVIDING PEDESTRIAN ALERTS

FIELD OF THE INVENTION

The invention relates generally to a system and method for providing alerts, such as pedestrian alerts. More specifically, the invention relates to a system and method for providing vehicle operators and/or pedestrians with alerts regarding potential vehicle-pedestrian collisions.

BACKGROUND

Accidents between pedestrians and vehicles are, unfortunately, a fairly common occurrence. This is especially troublesome in populous, urban areas, such as large cities where the densities of motorists and pedestrians are high. As populations and population densities increase, so do the number of pedestrians, the number of motorists on the road, and the likelihood of vehicle-pedestrians accidents.

A principal factor in such vehicle-pedestrian accidents is often the failure of a motorist to detect a pedestrian. Similarly, failure of a motorist to evaluate the potential for a collision with a pedestrian increases the risk of vehicle-pedestrian accidents. Many times a pedestrian does not enter the motorist's line of sight soon enough for the motorist to avoid a collision. While there are many causes for such failures on the part of the motorist, ranging from distraction to environmental conditions, such events are undesirable regardless of their cause.

A number of pedestrian detection systems have been proposed to prevent or lessen the likelihood of vehicle-pedestrian collisions. Additionally, attempts may be made to adapt systems designed to prevent collisions generally to prevent vehicle-pedestrian collisions specifically. Many of these prior approaches are inadequate, however, as they rely on line-of-sight detection methods, or require a significant and expensive infrastructure.

Detection systems that rely on direct, line-of-sight detection methods are greatly disadvantaged in settings where numerous obstacles are present. For example, urban settings having multiple buildings, parked cars, and other visual obstacles lessen the effectiveness of such techniques by screening visible light waves used for detection. Commonly, while a first vehicle approaches a traffic intersection from a first direction, a pedestrian or another vehicle may approach the intersection from around a corner of a building or from behind a parked car, out of the direct line-of-sight of such detectors. In such a setting, these visual obstacles make it difficult for direct line-of-sight detection systems to detect pedestrians that might present a potential for collision. Therefore, detection methods that require an unobscured, line-of-sight detection path to detect a pedestrian suffer from many of the same disadvantages as the motorist.

Examples of direct line-of-sight detection systems used to prevent collisions between vehicles and pedestrians or other objects can be seen in U.S. Pat. Nos. 4,543,577 and 4,549,181 to Tachibana et al., U.S. Pat. No. 6,223,125 to Hall, U.S. Pat. Nos. 5,983,161, 6,275,773, and 6,487,500 to Lemelson et al., U.S. Patent Application Publication No. U.S. 2002/0110261 A1 to Yanai, and U.S. Patent Application Publication No. U.S. 2002/0101360 A1 to Schrage. The systems of these documents suffer the disadvantages of direct line-of-sight detection described generally above.

While some non-line-of-sight detection systems have been proposed, some of those systems rely on large infrastructures and are, therefore, only effective where the components of such infrastructures have been installed. For example, some systems are intended for use as a part of a highway sign or signal system and thus only work in places where specially outfitted signs or signals have been installed. Similarly, stationary detectors, such as cameras, inductive loop detectors, and other similar detectors, are only useful in locations where those detectors have been installed. This is disadvantageous as a large expenditure of time, effort, and money to install and maintain such an infrastructure. Also, because implementing large infrastructures universally would be difficult, they would likely only be installed in certain areas, geographically limiting the usefulness of systems relying on such infrastructures.

Examples of systems that require extensive infrastructures for detecting vehicle and/or pedestrian locations can be seen in U.S. Pat. No. 6,223,125 to Hall, U.S. Pat. No. 6,337,637 to Kubata et al., U.S. Pat. No. 6,411,328 to Franke et al., U.S. Pat. Nos. 5,983,161; 6,275,773; and 6,487,500 to Lemelson et al., U.S. Pat. No. 6,519,512 to Haas et al., and U.S. Patent Application Publication No. U.S. 2003/0016143 A1 to Ghazarian. The systems of these documents suffer the disadvantages associated with systems that make use of large infrastructures described generally above.

Accordingly, it would be desirable to develop a system and method to provide a motorist with pedestrian alerts about pedestrian locations and/or the potential for vehicle-pedestrian collisions using non-line-of-sight detection of pedestrian location, speed, and/or heading, while not requiring an extensive infrastructure. It would also be advantageous to have a system that could provide alerts to a pedestrian.

SUMMARY

An embodiment of the invention provides alerts or warnings regarding dangers involving pedestrians and vehicles or between vehicles. For example, an embodiment of the invention provides warnings to vehicle operators regarding potential vehicle-pedestrian collisions. Alerts may also be provided to pedestrians regarding the potential for such collisions. Additional information regarding pedestrians may be provided to motorists, including for example, the location, speed, and/or heading of pedestrians in the area of the motorist's vehicle, a probability of collision with various pedestrians, and so forth. The system and method of the present invention, according to an embodiment thereof, provide a non-line-of-sight detection capability, and do not require extensive infrastructure, as they are implemented using devices carried by the pedestrians and the vehicles themselves. The non-line-of-sight capability of an embodiment of the invention includes the ability to transmit and receive signals through objects that might block the detection capabilities of visual detection systems or systems using other transmissions.

According to an embodiment of the invention, a vehicle is outfitted with a vehicular device that is capable of transmitting an activation signal received by one or more of multiple mobile devices. Each mobile device receiving the activation signal from the vehicular device is activated and begins transmitting positional information to the vehicular device, indicating the mobile device's position. The mobile device can determine the positional information to be transmitted to the vehicular device by way of received positional data or ranging signals. The vehicular device receives the positional information from each activated mobile device and determines the location, speed, and/or heading of each mobile device relative to the vehicular device. Based upon the determined location, speed, and/or heading of each device, the vehicular device predicts the probability of at least one of the mobile devices intersecting a warning zone near the vehicular device, thereby predicting the likelihood or potential for a vehicle-pedestrian collision.

Further features of the invention, and the advantages offered thereby, are explained in greater detail hereinafter with reference to specific embodiments illustrated in the accompanying drawings, wherein like elements are indicated using like reference designators.

DETAILED DESCRIPTION

Figure 1:
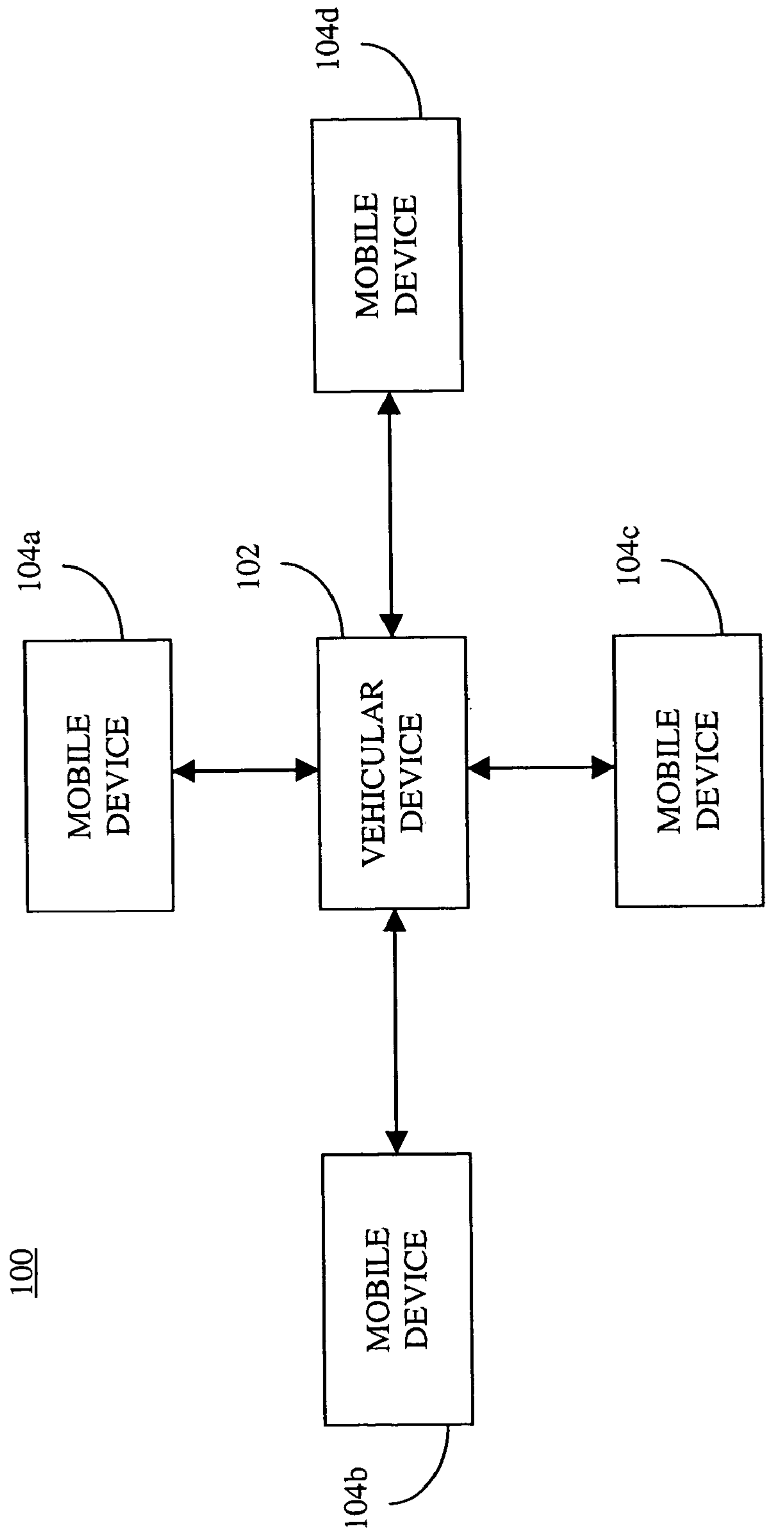
FIG. 1 is a block diagram of a system in accordance with an embodiment of the invention.

To facilitate an understanding of the principles and features of the invention, it is explained hereinafter with reference to its implementation in one or more illustrative embodiments. In particular, the invention is described in the context of a system and method for providing pedestrian alerts. More specifically, the invention is described in the context of a system and method for providing vehicle operators or motorists with alerts regarding potential collisions with pedestrians. The invention also can provide pedestrians with alerts or warnings of potential collisions.

According to an embodiment of the invention, a method is provided that includes transmitting an activation signal. A signal, which is generated by a remotely located mobile transmitter in response to the activation signal, is received. The location of the remotely located mobile transmitter that has generated the received signal is determined. Based on a set of predetermined rules, a prediction is made of whether the remotely located mobile transmitter is likely to come within a warning zone proximate to a first vehicle.

This embodiment can be implemented, for example, using a first device, such as a vehicular device carried by a vehicle, and a second device, such as a mobile device or mobile transmitter carried by a pedestrian that is remotely located from the first device. The first device transmits an activation signal that is received by the second device. The second device generates a signal in response to the activation signal received from the first device, and transmits the generated signal to the first device. The first device receives the signal transmitted by the second device, and determines the location of the second device. Based upon a set of pre-determined rules, the first device predicts whether the second device is likely to come within a warning zone proximate to a first vehicle. If the second device is predicted to come within the warning zone, an alert can be provided either via the first device or via the second device.

The invention, however, is not limited to its use described in the illustrative embodiments, but rather can find utility in a variety of contexts.

The term "activation signal" as used herein means a signal that is configured to elicit a response from any devices within the transmission range of the signal. For example, an activation signal can be used to change the power state of a device receiving the activation signal. This change in the power state may include, for example, a change from an "off" state, where components of the device are receiving no power, to an "on" state, where components of the device are receiving power to operate. This change in the power state may also include, for example, a change from an "inactive" or "dormant" state, where the device uses very little power (also referred to as a "power-saving" state) to an "active" or "operational" state, where the device is in a higher operational state and is not conserving power as much as when in the inactive or dormant state.

Additionally, an activation signal can be used, for example, to cause a device to begin transmitting a signal. Certain subsequent transmissions from a device within range of the activation signal can be considered to be in response to the activation signal. For example, a device not currently transmitting a signal, upon receiving the activation signal can begin to transmit a signal in response to the received activation signal. The response transmitted by the device can also be extended in response to subsequently transmitted activation signals.

A block diagram of a pedestrian alert system 100 is illustrated in FIG. 1, in accordance with an embodiment of the invention. In this pedestrian alert system 100, a vehicular device 102 is shown in communication with multiple mobile devices 104*a*, 104*b*, 104*c*, 104*d* (generally referred to as mobile device or devices 104). It will be appreciated that each of the mobile devices 104 may be substantially similar, or may vary from one another in accordance with various design parameters or other requirements. Each of the mobile devices is in communication with the vehicular device 102 (as represented by the two-way arrows in FIG. 1) to transmit information to and receive signals from the vehicular device 102.

Communication between the vehicular device 102 and the mobile devices 104 can occur using a variety of techniques, such as radio frequency (RF) communication or other communication techniques that do not require a direct, unobscured line-of-sight communications link. The vehicular device 102 can be operated from within a motorized vehicle either with or without the assistance of a motorist using the vehicular device 102. For example, in accordance with an embodiment of the invention, the vehicular device 102 can be outfitted with or connected to a user interface that provides the motorist of a vehicle the capability of interacting with the vehicular device 102. Such an interface could be relatively limited, providing information to a motorist, but not receiving any input from a motorist, or could be relatively complex, providing output to a motorist and receiving input from the motorist. The vehicular device 102 can operate unbeknownst to the user during most of the time, being integrated within one or more of the various systems of the vehicle and alerting the user only when the user's immediate attention is required (e.g., in the case of a predicted vehicle-pedestrian collision).

In practice, the vehicular device 102 sends transmissions to and receives transmissions from each of the mobile devices 104 located within a pre-determined range. The vehicular device 102 transmits an activation signal to activate all mobile devices 104 within the predetermined range. As a vehicle transporting the vehicular device 102 passes within the predetermined range of the mobile devices 104, each of the mobile devices 104 is activated upon receiving the activation signal transmitted from the vehicular device 102. Each mobile device 104, when activated, determines its position and transmits geopositional information to the vehicular device 102. For example, in accordance with an embodiment of the invention, each mobile device 104 determines its geopositional location by way of received ranging signals from one or more reference radio emitters. Such ranging signals can include, for example, global positioning system (GPS) signals, differential GPS (DGPS) signals, or other suitable geopositional determination signals. Relative positional information, determined with respect to the vehicular device 102, can also be used to determine the position of each mobile device relative to the vehicular device 102, and this relative information can be used either instead of, or in addition to geopositional information.

The vehicular device 102 receives positional information from each activated mobile device 104 within range and determines the location of each mobile device 104 relative to the location of the vehicular device 102. According to an embodiment of the invention, the vehicular device 102 makes use of either GPS or DGPS techniques to determine the geopositional location of the vehicle associated with the vehicular device 102. Additionally, the vehicular device 102 can make use of mapping information to compare the positions of each mobile device 104 within range relative to the position of the vehicle carrying the vehicular device 102. For example, various computer automated drafting (CAD) systems or mapping applications can be used to map the location of each mobile device 104 and the vehicular device 102. The vehicular device 102 can communicate information to a user regarding the location of each of the mobile devices 104 relative to the position of the vehicular device 102. This information can, for example, be output by way of a visual map, audible indications, or other suitable techniques.

Knowledge of the absolute position of the vehicular device 102 and/or the mobile devices 104 is not required. In an embodiment of the invention where only relative position information is transmitted from each mobile device 104 to the vehicular device 102, the vehicular device 102 can use the relative position information to determine the positions of the mobile devices 104 relative to the location of the vehicular device 102. For instance, the direction from which a signal is received from each mobile device 104 can be determined (e.g., by a direction-finding antenna or direction-finding antenna array) and a transmission time for that signal can be measured to determine the relative location of each mobile device 104 with respect to the vehicular device 102. Additionally, each mobile device 104 can determine a direction and transmission time of an activation signal received from the vehicular device 102, from which it can determine and report its position relative to the vehicular device 102.

Figure 2A:
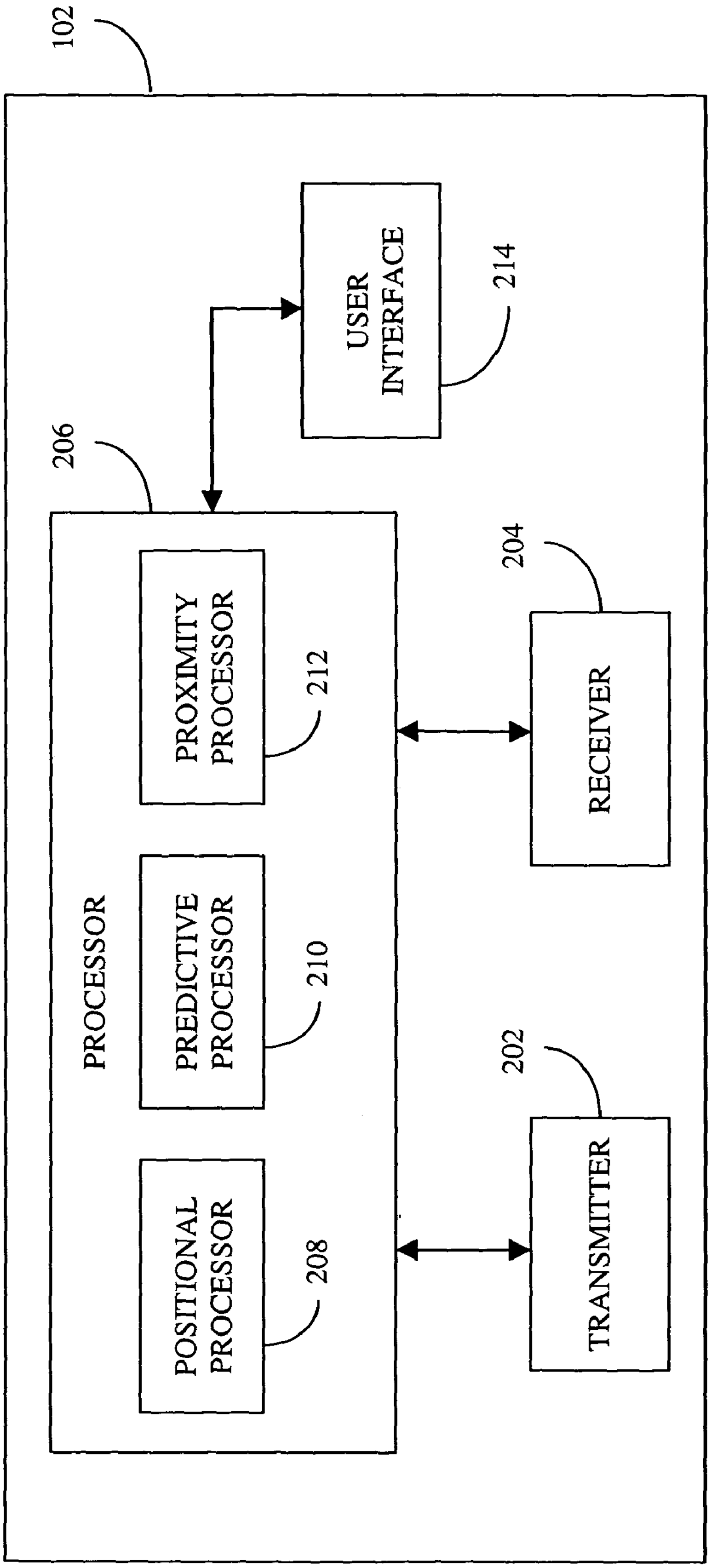
FIG. 2A is a block diagram of a vehicular device in accordance with an embodiment of the invention.

FIG. 2A is a block diagram of an embodiment of the vehicular device 102 illustrated in greater detail. A transmitter 202 and a receiver 204 are provided to transmit information to and receive information from mobile devices 104 within range of the vehicular device 102. It will be appreciated that, although they are shown separately in FIG. 2A, the transmitter 202 and the receiver 204 can be combined in a single transceiver device having both transmitting and receiving capabilities. In accordance with embodiments of the invention that make use of GPS and DGPS signals, or other positioning or ranging signals, the receiver 204 can also receive GPS, DGPS, or other positioning or ranging information. Additionally, multiple receivers 204 can be implemented to each track individual mobile devices 104 or a subgroup of mobile devices 104 within transmission range.

Several technologies can be used to handle incoming communications received by one or more receivers 204. For example, incoming communications can make use of techniques, such as time division multiple access (TDMA), frequency division multiple access (FDMA), code division multiple access (CDMA), spatial division multiple access (SDMA), spread spectrum, frequency hopping, ultra wide band (UWB) spread spectrum, or other suitable techniques. These techniques allow one or more receivers 204 to handle communications from multiple mobile devices 104 at approximately the same time. Additionally, when receiving multiple communications from multiple mobile devices 104, a buffer or queue can be used to hold multiple received communications until the vehicular device 102 is able to retrieve and process the communication.

The transmitter 202 and receiver 204 are each coupled to a processor 206 that processes signals received by the receiver 204 and determines what signals are to be transmitted via the transmitter 202. If the processor 206 receives multiple signals from a mobile device 104 (e.g., in a multi-path situation), the processor 206 can determine the most reliable signal. The processor 206 can be considered to provide a number of individual sub-processor functions. These sub-processor functions include a positional processor 208, a predictive processor 210 and a proximity processor 212. In one embodiment, theses subprocessing functions could be performed by a single processor. Alternatively, any one or all of the sub-processors illustrated as part of the processor 206 can be an individual processor, external to the processor 206 or to the vehicular device 102 itself. Thus, a vehicular device 102 can use processing capability available in a vehicle in which the device 102 is used if such capability exists.

The positional processor 208 receives geopositional information (or other positional information) from each mobile device 104 within transmission range of the vehicular device 102. This positional information can be used in connection with other applications, such as mapping systems, or the like. According to some embodiments of the invention, relative position information is received from each mobile device 104, and the absolute position of each device 104 is determined by the positional processor 208 using the relative position information and the absolute position information of the vehicular device 102. According to other embodiments of the invention, the positional processor 208 uses only relative position information received from each mobile device 104 to determine the position of each mobile device 104 relative to the vehicular device 102. Alternatively, according to some embodiments of the invention, absolute position information (e.g., GPS geopositional information, etc.) can be received from each mobile device 104 and processed by the positional processor 208 along with absolute position information for the vehicular device 102.

Positional information determined by the positional processor 208 is used by a predictive processor 210 to determine information for each mobile device 104, including a location, speed, and/or heading (or bearing) and similar information for the vehicular device 102. According to an embodiment of the invention, the predictive processor 210 determines locations of the various mobile devices 104 and the vehicular device 102 at specific intervals or "time marks." The predictive processor 210 uses various algorithms to determine the headings of each of the devices whose positions have been received from the positional processor 208. Once the predictive processor 210 has determined the location, speed, heading, and/or time mark of each device, it then predicts the likely future position of the vehicle associated with the vehicular device 102 and the pedestrian associated with each mobile device 104. These predictions may be performed periodically at a frequency associated with the motion of the vehicular device 102 and the mobile devices 104. For example, as the speed of the vehicle carrying the vehicular device 102 increases or decreases, the frequency with which predictions and other calculations are performed can increase or decrease correspondingly. The manner in which the future positions of the various devices are predicted is described in greater detail below.

A proximity processor 212 determines the proximity of each of the mobile devices 104 to the vehicular device 102. The proximity processor 212 uses position information from the positional processor 208, to determine proximity information for each of the mobile devices 104 with respect to the vehicular device 102. The proximity processor 212 determines a warning zone, which represents an area of danger for pedestrians near the vehicle carrying the vehicular device 102. The proximity information determined by the proximity processor 212 can be used by the predictive processor 210 along with the likely future positions of devices 104 to predict the likelihood of any of the mobile devices 104 coming within the pre-determined warning zone near the vehicular device 102. When the predictive processor 210 determines that one of the mobile devices 104 is likely to intersect the warning zone, an alert or warning can be provided to a motorist or user via a user interface 214. Additionally, alerts or warnings can be transmitted via the transmitter 202 to those mobile devices 104 predicted to intersect the warning zone near the vehicular device 102. Such alerts warn pedestrians carrying those mobile devices 104 that they are in danger. Determination of the warning zone is described in greater detail below.

The user interface 214 can comprise a variety of suitable interfaces for communicating information to a user or motorist regarding the position of the various mobile devices 104 relative to the position of the vehicular device 102. According to an embodiment of the invention, the user interface 214 may simply comprise an audible interface that provides a motorist with an audible alert when it is likely that one of the mobile devices 104 will come within a warning zone near the vehicular device 102. The predictive processor 210, upon determining that such an intersection is likely according to pre-determined rules and algorithms, can also determine the optimal warning time necessary for a motorist to avoid such a potential collision, and provide an alert to the motorist via the user interface 214 in sufficient time to react to the situation and prevent any collision. In providing such timely alerts, the predictive processor 210 can, for example, take into account numerous parameters, such as the vehicle's speed, the speed of the mobile devices 104, reaction time of a driver, or other measured or predicted quantities, as described in greater detail below.

According to an embodiment of the invention, the user interface 214 can also provide visual or graphic information. For example, visual or graphical information can be conveyed to a user or motorist by way of a graphical user interface (GUI) in the form of a map, indicating the location of the vehicular device 102 and any mobile device 104 within a predetermined range of the location of the vehicular device 102. Various viewing preferences can be provided to allow a motorist to interact with the visual display of such a GUI. For example, a zooming feature that allows a user to increase or decrease the portion of the map being displayed by the user interface 214 can be provided.

The vehicular device 102 also can be easily integrated with a variety of existing mapping systems and their respective GUIs, which are available in some vehicles. Such systems are primarily used for navigation of roads, and provide a motorist with a detailed, accurate street map of the vehicle's immediate location. Many of these systems make use of data processors, GPS receivers, and user interface components. Thus, some embodiments of the invention can make use of these existing systems either in place of or in addition to components of the vehicular device 102. For example, an embodiment of the invention uses the GPS receiver, the processor, and the user interface of an already-existing vehicle navigation system as the receiver 204, processor, and user interface 214 shown in FIG. 2. Thus, an external processor can be used to calculate location and proximity of the devices, and can be used to execute predictive algorithms communicated to the external processor from the vehicular device 102. Such an external processor can be used to perform calculations for use by the vehicular device 102. Additionally, if the external processor is programmable, it can be used to make predictions based upon pre-determined rules stored by the vehicular device 102, once those pre-determined rules and any programs necessary to implement those rules have been uploaded to the external processor.

Figure 2B:
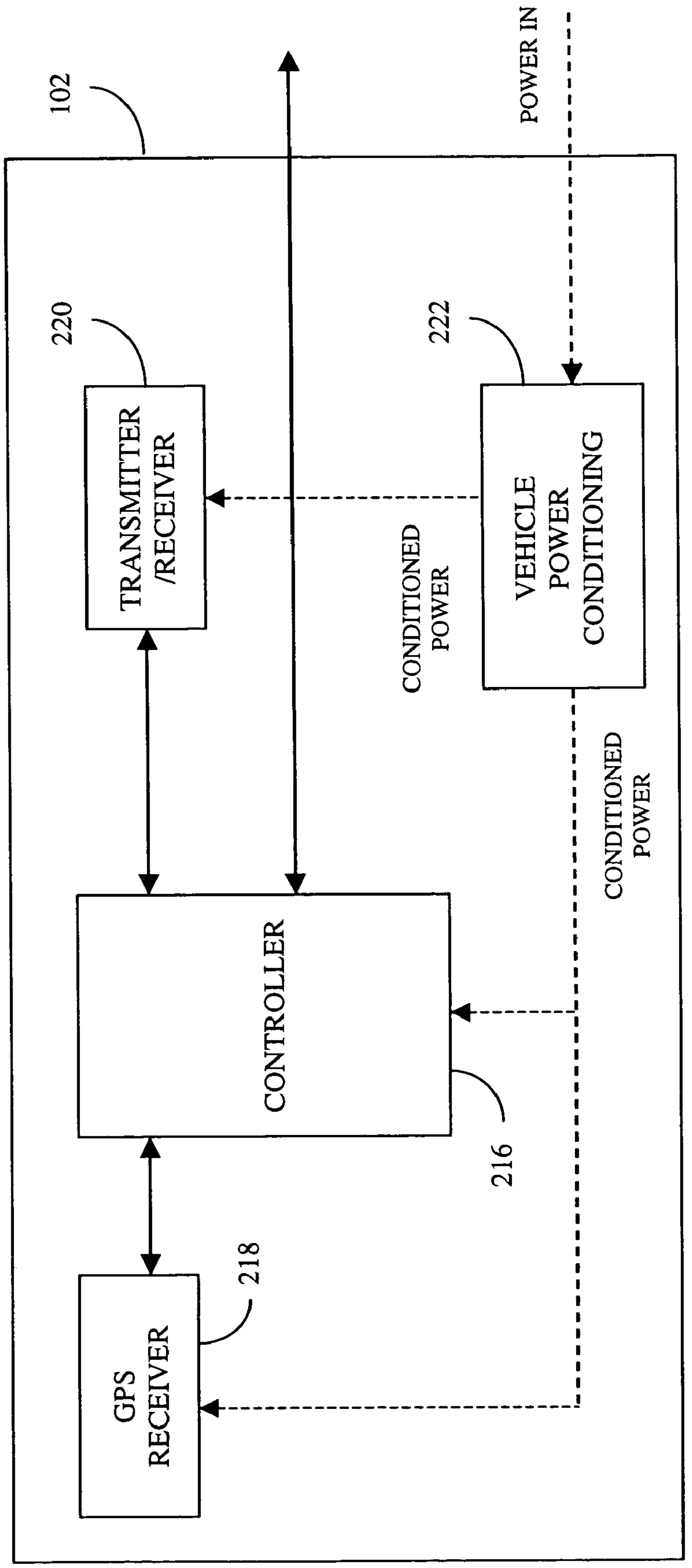
FIG. 2B is a block diagram of a vehicular device in accordance with an embodiment of the invention.

FIG. 2B is a block diagram illustrating another embodiment of the vehicular device 102 for use with some embodiments of the invention, which operates in a manner similar to the embodiment shown in FIG. 2A. The vehicular device 102 shown in FIG. 2B uses a controller 216 to control operations of the device 102 and its various components. The controller 216 can be an embedded microcontroller or other embedded computing device capable of performing the calculations necessary for operation of the vehicular device 102. The controller 216 shown in FIG. 2B provides functionality similar to the functionality described above in connection with the processor 206 shown in FIG. 2A.

The controller communicates with a GPS receiver 218 that receives GPS positioning signals. The positional information received by the GPS receiver 218 is communicated to the controller 216 and is used in calculations performed within the controller. The GPS receiver 218 may include a single element or a multi-element antenna array that is capable of receiving GPS signals from satellites and/or tracking those satellites. For example, a GPS receiver 218 having a multi-element antenna array can be used to track locations of GPS satellites either according to previously known position information for the satellites or based on signals received from those satellites. The controller 216 provides control information to the GPS receiver 218. As shown by the two-way arrow between the controller 216 and the GPS receiver 218, additional data can be communicated from either component to the other.

The controller 216 also communicates with the transmitter/receiver component 220. This component 220 communicates with mobile devices 104 within transmission range of the vehicular device 102. The transmitter 220 transmits an activation signal to any mobile devices 104 within range and the receiver 220 receives any information communicated from those devices 104 to the vehicular device 102, such as GPS or other position data for the mobile devices 104, a device identification number, or other information. This transmitter/receiver component 220 can be a single transceiver unit that is capable of both transmitting and receiving communications signals, or separate transmitting and receiving devices.

The controller 216 is also configured to communicate with devices external to the vehicular device 102, as shown by the two-way arrow between the controller 216 and a location external to the vehicular device 102. For example, the controller 216 can transmit alerts to a user (e.g., a vehicle motorist) regarding the proximity of pedestrians using the mobile devices 104, or regarding a likely collision with those pedestrians. This information can be communicated in the form of a simple audio warning, or can be communicated to the motorist via a user interface external to the vehicular device 102, such as those described above in connection with FIG. 2A, for example. Where a external user interface is employed, the controller 216 can also receive input from and communicate information to that interface.

The vehicular device 102 can also make use of a vehicle power-conditioning component 222 to condition power provided to its various components. The vehicle power conditioning component 222 smoothes the electrical power signal of the vehicle used to power the vehicular device 102, such that the power supplied to the components of the device 102 is within the tolerances of those components. Power received from the vehicle is represented in FIG. 2B as a dashed line labeled "POWER IN." Power that is conditioned by the power-conditioning component 222 and provided to the components of the vehicular device 102 is represented by dashed lines in FIG. 2B labeled "CONDITIONED POWER." By way of the vehicle power-conditioning component 222, excess voltage and current as well as any excessive noise on the power signal supplied from the vehicle powering the vehicular device 102 can be removed (e.g., by filtering) to prevent electrical interference with communication signals or damage to components, such as the controller 216.

Transmission and reception capabilities of the vehicular device 102 may vary depending on the various design constraints and requirements. For example, some embodiments of the invention may make use of a broad range of data rates up to approximately 115 kilobits per second (kb/s). In accordance with an embodiment of the invention, the vehicular device 102 and the mobile devices 104 can communicate at a data rate between about 4 kb/s and 15 kb/s. For example, a data rate of approximately 9.6 kb/s may provide sufficient power density per bit over time to allow short message links with relatively high power density, increasing the likelihood of proper reception. Additionally, data rates within the range of 4 kb/s–15 kb/s may allow for transmission using carrier frequencies that are not easily screened or blocked by physical objects, and thus do not require an unobscured line-of-sight transmission path.

In accordance with an embodiment of the invention, a typical data rate between the vehicular device 102 and each mobile device 104 within transmission range is about 6 kb/s, and the length of each message is about 152 bits per message. This data rate allows for approximately 40 communications links per second between the vehicular device 102 and mobile devices 104 (e.g., one link per second between the vehicular device 102 and about 40 mobile devices 104), each communication link having a duration of approximately 25 ms. The number of possible communications links may be increased, for example, if the data rate is increased or if multiple receivers are implemented in a parallel configuration in the vehicular device 102.

Figure 3A:
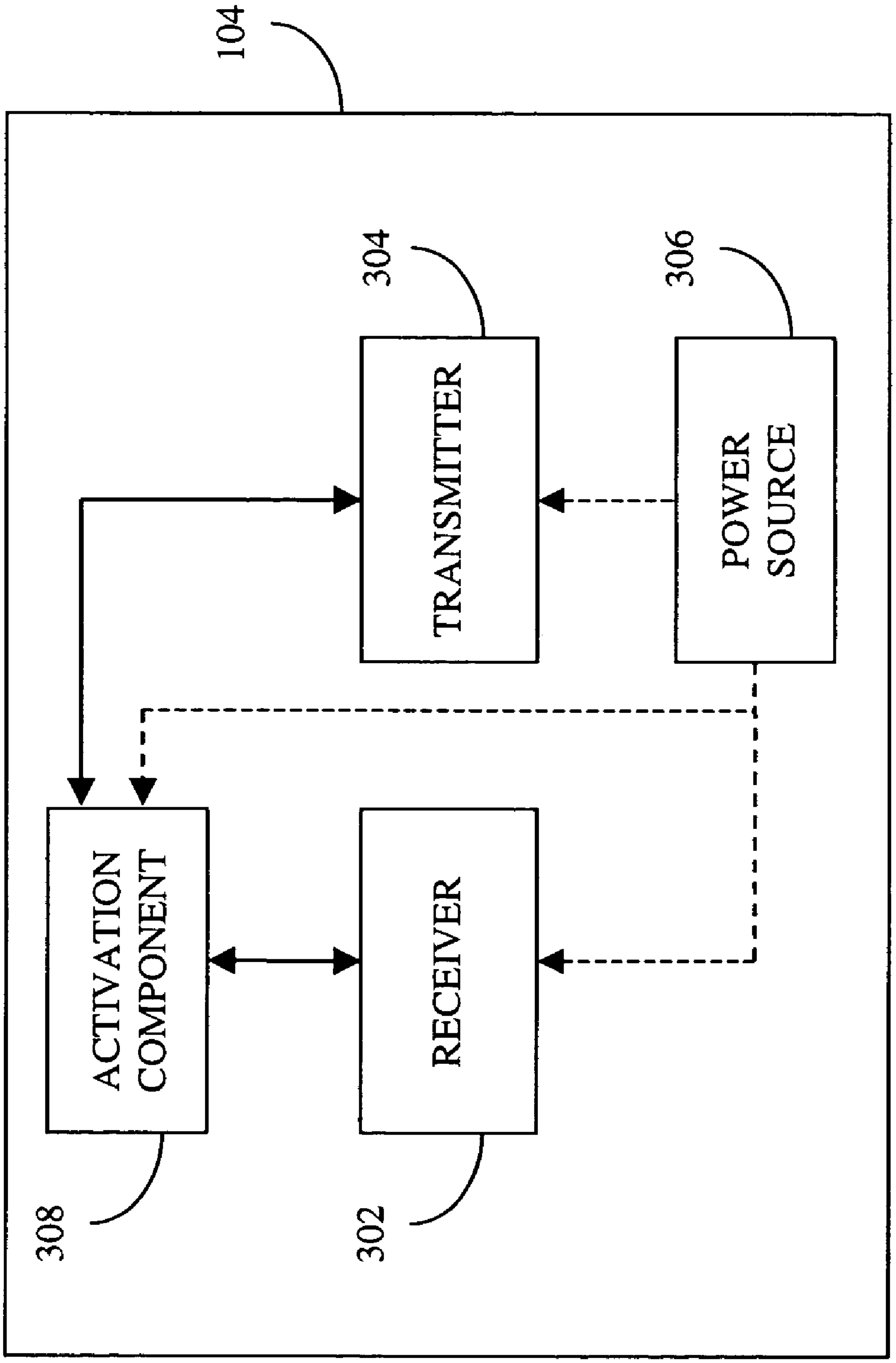
FIG. 3A is a block diagram of a mobile device in accordance with an embodiment of the invention.

FIG. 3A is a block diagram illustrating a mobile device 104 in greater detail. The mobile device 104 makes use of a receiver 302 and a transmitter 304. The receiver 302 and transmitter 304 can be separate components or can be part of a single transceiver component. The receiver 302 can be used for receiving communications signals from the vehicular device 102, as well as for receiving positional signal information from a ranging system, such as those provided by a GPS satellite, for example. In accordance with an embodiment of the invention, a GPS receiver incorporated as part of the receiver 302 is small so as to provide optimal portability. For example, in accordance with an embodiment of the invention, a GPS receiver measuring less than one square inch in surface area can be used as part of the receiver 302. This GPS receiver can be used to measure the position, speed, and/or bearing of the mobile device 104.

The transmitter 304 of the mobile device 104 is used to transmit information from the mobile device 104 to one or more vehicular devices 102. Information transmitted via the transmitter 304 of the mobile device 104 can include, for example, information such as geopositional information of the mobile device 104, and information relating to speed and/or bearing of the mobile device 104. According to an embodiment of the invention, information transmitted by way of the transmitter 304 includes error correction information.

According to an embodiment, the receiver 302 and transmitter 304 of the mobile device 104, as with the receiver 204 and transmitter 202 of the vehicular device 102, can include multiple receivers or transmitters, respectively. For example, one of multiple receivers could be used for receiving communications from any vehicular device 102 within range, and another of the plurality of receivers could be a ranging signal receiver, such as a GPS receiver, a DGPS receiver, or the like.

Additionally, multiple transmitters can be provided such that each transmitter communicates with a different, unique vehicular device 102 within transmission range of the mobile device 104. For example, each transmitter can information coded for a particular vehicular device 102, based upon a code received from the vehicular device 102 (e.g., in an activation signal). In such an embodiment, the mobile device 104 can make use of a variety of techniques to process activation signals from each vehicular device 102 within range. For example, incoming communications can make use of techniques, such as TDMA, FDMA, CDMA, SDMA, spread spectrum, frequency hopping, UWB spread spectrum, or other suitable techniques. These techniques allow one or more receivers 302 to handle communications from multiple vehicular devices 102 at approximately the same time. Additionally, when receiving multiple communications from multiple vehicular devices 102, a buffer or queue can be used to hold multiple received communications until the mobile device 104 is able to retrieve and process the communication.

The mobile device 104 makes use of a portable power source 306, which provides the desired portability for the mobile device 104 and its various components. The power source 306 provides power (represented by dashed lines in FIG. 3A) to each component of the mobile device 104. According to an embodiment of the invention, the power source 306 may comprise a variety of suitable power sources, such as a rechargeable battery, or the like. For example, a rechargeable battery can provide a charge for a period of about 48 hours or longer to allow for extended, portable use of the mobile device 104. Examples of suitable rechargeable power sources include, but are not limited to, nickel-cadmium (NiCd) batteries, lithium-ion (Li-ion) batteries, nickel metal hydride (NiMH) batteries, or other rechargeable batteries. Additionally, non-rechargeable batteries, such as alkaline batteries, can also be used as the power source 306. Other types of power sources, such as rechargeable, low-loss capacitors, can be used to as a primary or secondary power source for the mobile device 104, especially where the design of the mobile device 104 does not require a large amount of current to operate.

In accordance with an embodiment of the invention, the receiver 302 and the transmitter 304 can enter a dormant state when they are not in use to conserve power and to extend the life of the power source 306. For example, after a pre-determined period of inactivity where no signals are received or transmitted, the receiver 302 and transmitter 304 can be switched to a dormant or less-active state in which they draw less power from the power source. Because of the decreased power requirements of the components of the mobile device 104, the device 104 itself is essentially dormant. The dormant state of the receiver 302 can be slightly different from the dormant state of the transmitter 304, allowing the receiver 302 to continue to receive positional information and activation signals. The pre-determined period of inactivity required to switch components to a dormant state can be relatively short. For example, in accordance with one or more embodiments of the invention, components can be switched to a dormant state or deactivated after about 1 μs of inactivity. Consequently, the mobile device 104 is extremely power-efficient, as each of its components is generally deactivated a majority of the time, except in the areas most densely populated with vehicular devices 102.

As described above, according to an embodiment of the invention, the vehicular device 102 transmits an activation signal to "wake up" any mobile devices 104 within range of the activation signal. When the receiver 302 of the mobile device 104 receives the activation signal, the activation component 308 activates the components of the mobile device 104, changing them from a power-saving, dormant state to an active, operational state. Once the activation component 308 activates the receiver 302 and the transmitter 304, the receiver 302 begins receiving geopositional information signals (e.g., GPS signals), and the transmitter 304 begins transmitting information to the vehicular device 102, such as geopositional, speed, and/or bearing information. According to an embodiment of the invention, the mobile device 104 transmits geopositional information omni-directionally once an activation signal has been received for a specified time period. This specified time period can be a parameter that is pre-determined, or it can be determined dynamically according to statistical data obtained during operation of the device. Additionally, according to an embodiment of the invention, the specified time period can be adjusted or tuned according to user preferences and/or other parameters. The time period can be increased, for example, in response to one or more additional activation signals that are received.

If the receiver 302 and other components are not in a dormant or inactive state when an activation signal is received, they continue to receive geopositional information, and transmit (via the transmitter 304) to the vehicular device 102 sending the activation signal. Thus, the activation signal can be received and can cause a mobile device 104 to transmit information, regardless of whether the activation signal is received while the mobile device 104 is in an active, operational or inactive, dormant state. In accordance with an embodiment of the invention making use of GPS or similar satellite positioning signals, the receiver 302 can be activated periodically (e.g., about once per hour) to check the orbital positions of the various satellites from which the positioning signals are being received. By periodically checking the orbital positions of satellites, the mobile device 104 is able to more quickly locate those satellites and transmit geopositional data when they are subsequently activated from a dormant state.

Figure 3B:
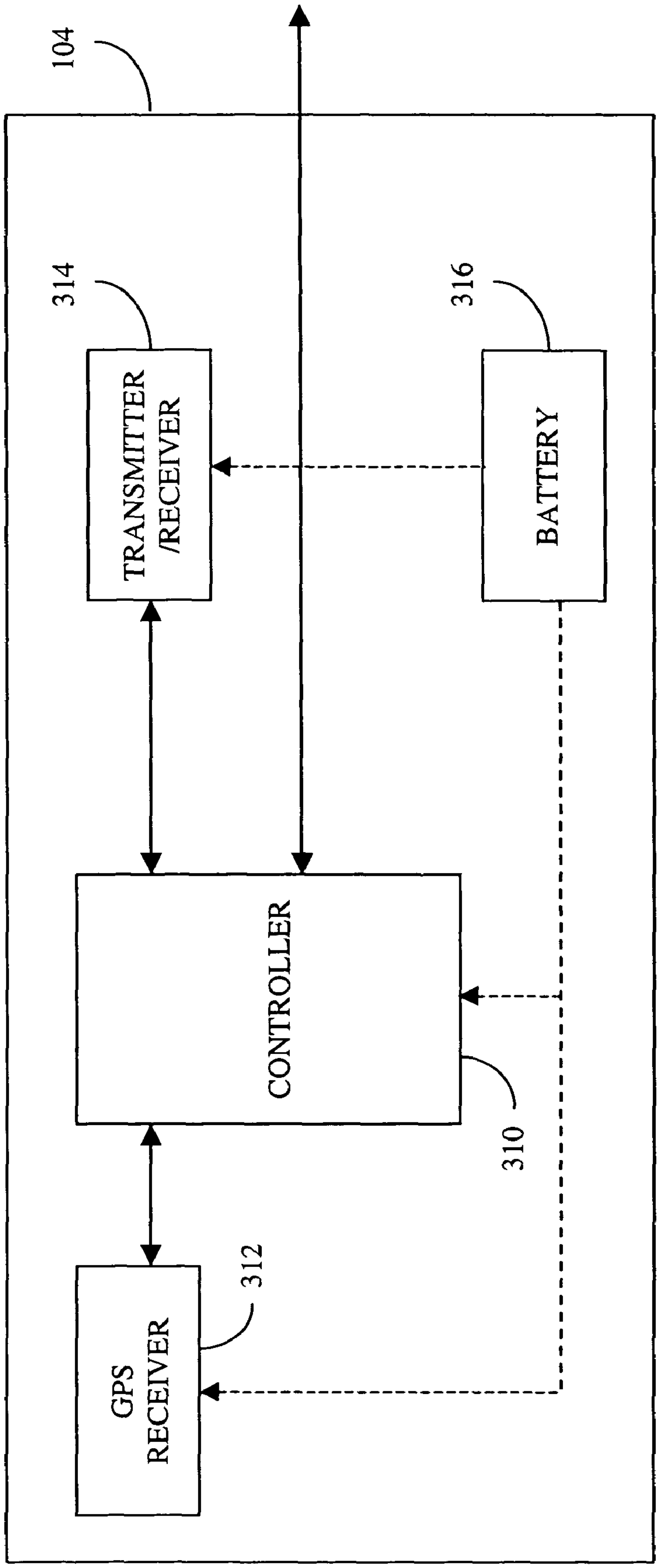
FIG. 3B is a block diagram of a mobile device in accordance with an embodiment of the invention.

FIG. 3B is a block diagram of another embodiment of the mobile device 104 that operates in a manner similar to the mobile device 104 shown in FIG. 3A. In FIG. 3B, a controller 310, which may be an embedded microcontroller or the like, communicates with the various components of the mobile device 104 and controls the operation of the mobile device 104 generally.

The controller 310 communicates with a GPS receiver 312, which may include one or multiple GPS signal receiving antenna elements. The controller 310 receives GPS data regarding the position, speed, and/or bearing of the mobile device 104, from the GPS receiver 312, and transmits control data to the GPS receiver 312. As shown by the two-way arrow between the controller 310 and the GPS receiver 312, additional data can be communicated from one component to the other.

The controller 310 also communicates with a transmitter/receiver component 314, which may include one or more transmitters, receivers, and/or transceivers. When the receiver 314 receives an activation signal from a vehicular device 102 within transmission range, the receiver communicates the activation signal to the controller 310, which activates the various components of the mobile device 104 in a manner similar to the activation described above in connection with the device shown in FIG. 3A. When the controller has received positioning information from the GPS receiver 312, this information is passed to the transmitter 314, which transmits it to any vehicular devices 102 within transmission range. In addition to position information, the controller 310 can communicate other information to vehicular devices 102 within transmission range. For example, the controller 310 can transmit, via the transmitter 314, identification information for the mobile device 104. Additionally, where other information, such as speed, bearing, or the like, are stored or calculated by the controller 310, this information can also be transmitted via the transmitter 314 to any vehicular devices 102 within transmission range.

The mobile device 104 also has a battery component 316, which provides power (represented by dashed lines in FIG. 3B) to each component of the device 104. As with the power source 306 shown in FIG. 3A, the battery component 316 can be a variety of suitable power sources configured to provide power to the mobile device 104. For example, according to an embodiment of the invention, the battery 316 is a rechargeable device capable of providing power to the mobile device 104 for about 48 hours between charging cycles.

The controller 310 is configured to communicate directly with additional devices, other than those described above. These additional devices can include additional components of the mobile device 104 or can be external to the device 104 (e.g., as shown by the two-way arrow connected to the controller 310 and extending outside the mobile device 104). For example, an additional alert or alarm component can be either included in the mobile device 104, or provided externally to the device 104. Additionally, the control 310 can communicate with a user interface component that forms part of the mobile device 104, or which is external to the mobile device 104.

To protect users of the mobile devices 104, no personal information regarding the user is transmitted to the vehicular devices 102, except for instances in which it would be desirable (e.g., when a user is a child, etc.). In accordance with an embodiment of the invention, the system can provide additional privacy by encoding the transmitted signal. For example, the activation signal transmitted by the vehicular device 102 can be encoded, such that the mobile device 104 recognizes unique codes for each vehicular device 102 within transmission range. Transmissions to the vehicular device 102 from each mobile device 104 can then be encoded according to a code received from the vehicular device 102 to provide maximum privacy during transmission. Thus, because each mobile device 104 can encode information it transmits using a code received from the vehicular device 102 in an activation signal, eavesdropping on the signal transmitted from each mobile device 104 is difficult, and the intended recipient (i.e., the vehicular device 102 that sent the activation signal) is likely to be the only device capable of decoding the transmitted signal. Alternatively, each mobile device 104 can independently and uniquely encode its transmissions, without regard to the vehicular device 102. For example, transmissions could be encoded using known encoding or encryption techniques commonly employed with wireless large area networks (LANs).

Additionally, although not illustrated in FIG. 3A or FIG. 3B, a pedestrian alert component (i.e., some type of alert system or user interface) can be incorporated as part of the mobile device 104 to alert a user of the mobile device 104 when the device has been activated by a vehicular device 102 within range, or when a warning signal is received from a vehicular device 102 indicating a possible collision or other potential danger. for example, a sound, vibration, or other means of providing an alert to a user can be used by a pedestrian alert component to provide an alert.

Figure 4A:
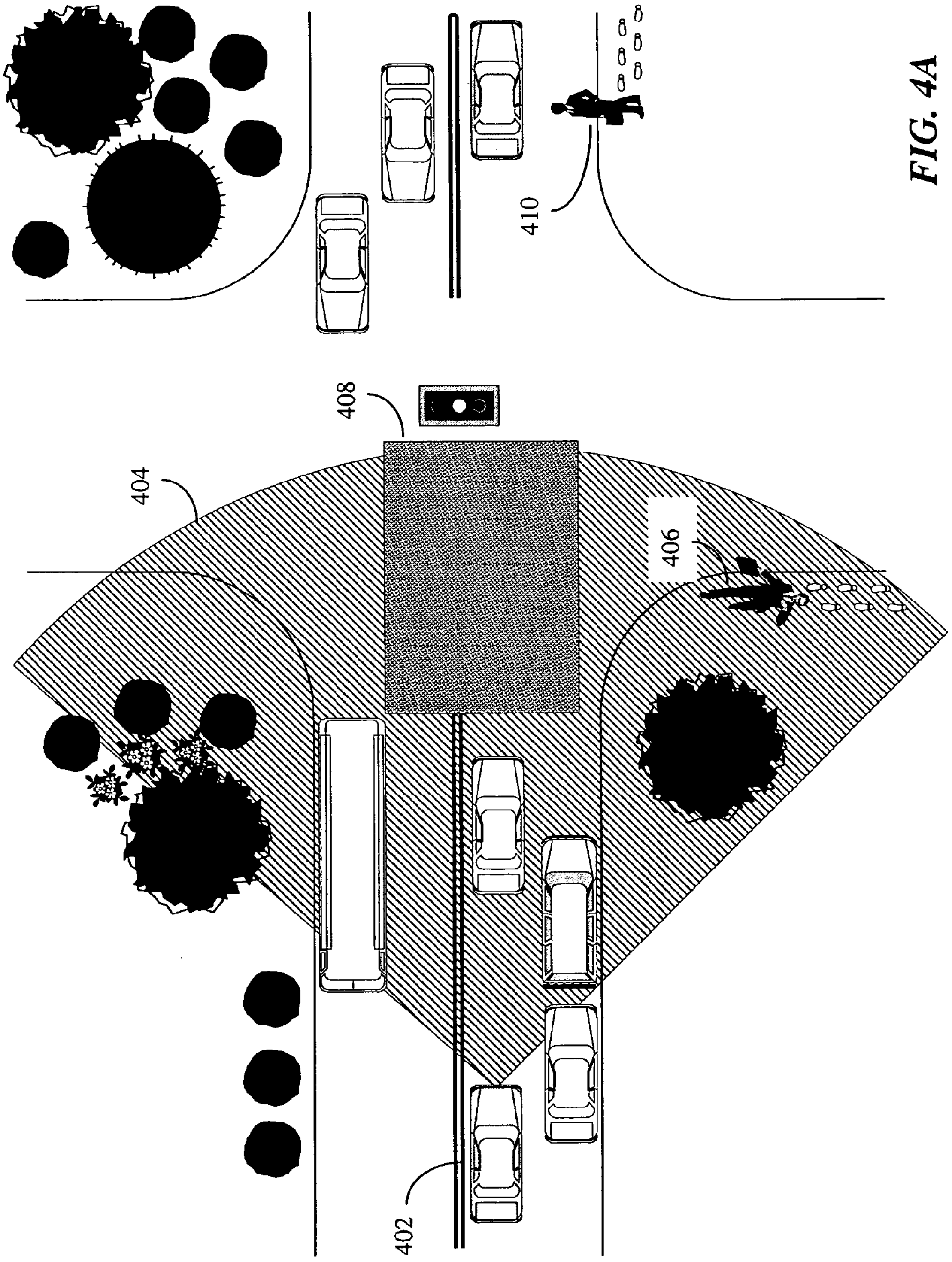
FIG. 4A is a diagram illustrating various aspects of an embodiment of the invention.

FIG. 4A illustrates various aspects of the operation of an embodiment of the invention. The system illustrated in FIG. 4A makes use of the technique shown in the flow chart of FIG. 4B. Therefore, elements of FIG. 4A are described in connection with the related steps in the technique shown in the flow chart of FIG. 4B for greater understanding.

In FIG. 4A, a vehicle 402 using a vehicular device, such as the vehicular device 102 described above, is shown approaching a traffic intersection. As explained above, the vehicular device 102 determines position, bearing, and/or speed information of the vehicle 402 carrying the vehicular device 102. By way of its transmitter 202, the vehicular device 102 transmits an activation signal 404, as shown in step 412 of FIG. 4B. The activation signal 404 is continuously transmitted and refreshed by the vehicular device 102 in parallel with other steps illustrated in FIG. 4B, as represented by the return path labeled "REFRESH." The transmission pattern of the activation signal 404 illustrated in FIG. 4A is a section of a circle, but in practice the transmission pattern can take a variety of shapes. For example, in accordance with some embodiments of the invention, the transmission pattern of the activation signal can be essentially omni-directional. Other embodiments can make use of activation signals having transmission patterns with specific, desired geometries, such as conical, cylindrical, or other shapes. These transmission pattern shapes can be achieved by way of multiple antenna elements, such as elements in a phased array configuration, or the like.

As can be seen in FIG. 4A, one advantage of the illustrated embodiment of the invention is that no direct, unobscured line-of-sight communication path between a mobile device 104 carried by a pedestrian 406 and the vehicular device 102 carried by the vehicle 402 is required. For example, the pedestrian 406 shown in FIG. 4A approaching the intersection is blocked from view of the vehicle 402 by way of parked cars and a tree. Because of this, the pedestrian 406 may be difficult for the driver of the vehicle 402 to see. However, because the vehicular device 102 uses radio frequency signals to establish a direct or multipath, reflected communications link with the mobile device 104 carried by the pedestrian 406, the surrounding obstacles do not impair the system's functionality. Upon receiving the activation signal sent in step 412 of FIG. 4B, the pedestrian's mobile device 104 is activated without requiring a direct, unobscured line-of-sight path between the mobile device 104 and the vehicular device 102. Thus, the system illustrated in FIG. 4A is advantageous over prior approaches, which make use of technologies that would not be able to establish a communications between the vehicular device 102 carried by the vehicle 402 and the mobile device 104 carried by the pedestrian 406 because of the surrounding obstacles (e.g., trees, cars, etc.).

Once the mobile device 104 carried by the pedestrian 406 has been activated, it begins to transmit information regarding its geopositional location, speed, and/or bearing to the vehicular device 102 carried by the vehicle 402. The information transmitted by the mobile device 104 is received by the vehicular device 102 in step 414 of FIG. 4B, along with the information of any other mobile device 104 within range of the activation signal 404. The vehicular device 102 then determines the positions of each mobile device 104 within range relative to the vehicular device 102, as well as other information (e.g., speed, heading, time marks, etc.), in step 416 of FIG. 4B. According to an embodiment of the invention, information from several mobile devices 104 can be received by the vehicular device 102 and stored in a buffer or queue for later retrieval and processing by the components of the vehicular device 102.

Figure 4B:
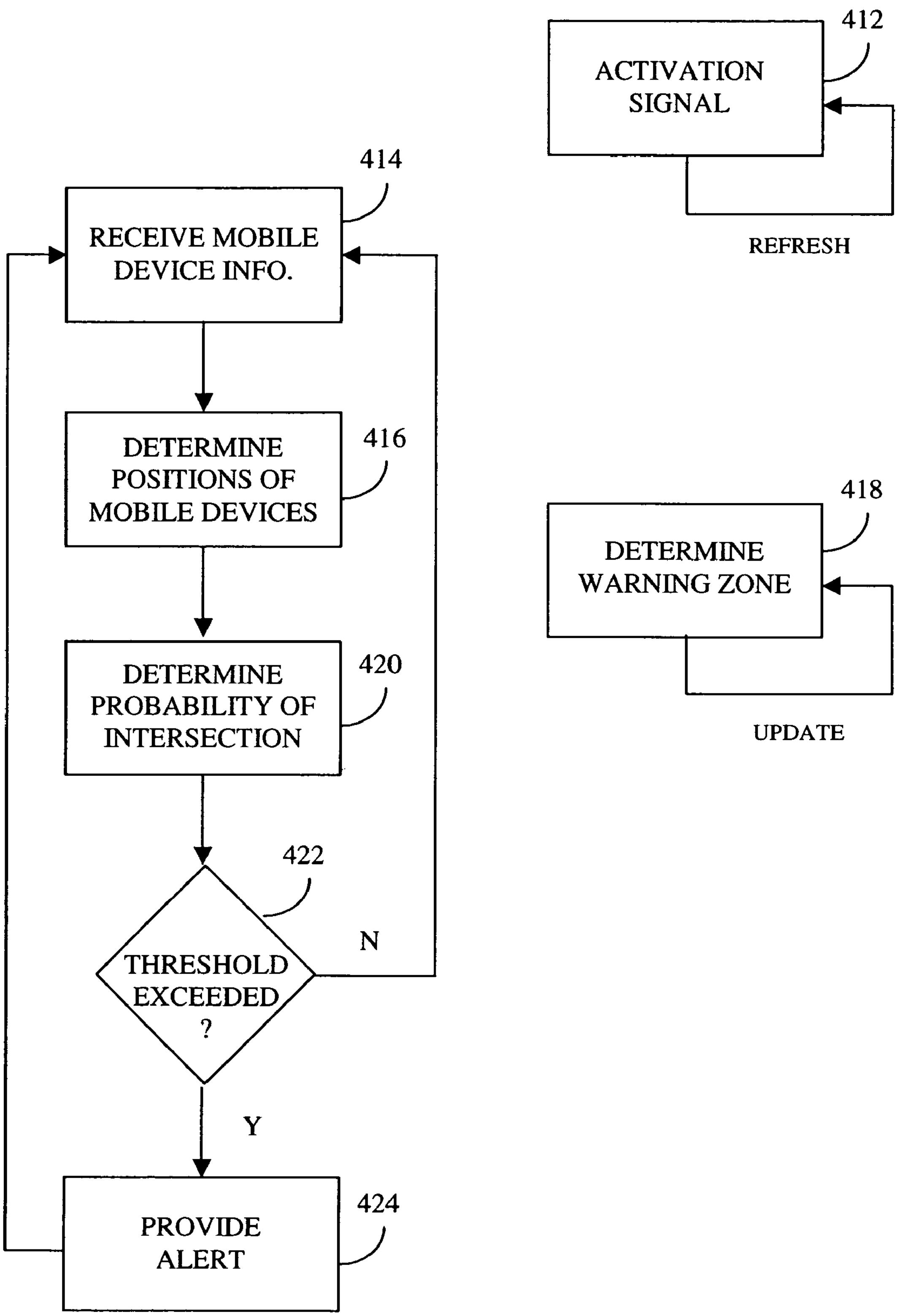
FIG. 4B is a flow diagram illustrating steps of a method according to an embodiment of the invention.

A warning zone 408, near the vehicle 402, is determined in step 418 of FIG. 4B by the vehicular device 102. The warning zone 408 is determined and continuously updated in parallel with the other steps of FIG. 4B, as indicated by the return path labeled "UPDATE." The warning zone 408 may also be referred to as an alert zone, as it is used to determine whether or not an alert or a warning should be generated to warn the operator of the vehicle 402, a nearby pedestrian 406, or both, of a potential vehicle-pedestrian collision or other danger. Once the warning zone 408 has been determined, the probability of any mobile device 104 within range, such as the mobile device 104 carried by the pedestrian 406, intersecting the warning zone 408 is determined by the vehicular device 102 in step 420 of FIG. 4B.

Once the probability of any mobile device 104 intersecting the warning zone 408 has been determined, a determination is made by the vehicular device 102 in step 422 of FIG. 4B, regarding whether or not the probability of intersection (and a potential collision) exceeds a predetermined probability threshold (or meets a predetermined threshold, depending upon the design of the system). This threshold may be based, for example, on a variety of statistical, predictive, and other factors. In addition to statistical, predictive, and other factors, the processor 206 or controller 216 of the vehicular device 102 can use adaptive algorithms, such as neural networks, or the like, to constantly update the rules of prediction used to determine the probability of intersection and potential for a vehicle-pedestrian collision.

If it is determined in step 422 that the pre-determined probability threshold has been exceeded, an alert is provided in step 424 of FIG. 4B. If, on the other hand, it is determined that the threshold has not been exceeded, then the system returns to step 414, any newly-received mobile device 104 information of mobile device information 104 stored in a queue is retrieved, and the process of FIG. 4B repeats itself.

The alert provided in step 424 of FIG. 4B can be an alert to the motorist of the vehicle 402, an alert to any pedestrian within range of the activation signal 404 (e.g., pedestrian 406), or a combination alert to both the motorist and one or more pedestrians. This alert can be, for example, an audible alert, a visual indication, or other suitable alert. A visual indication, such as a light on a dashboard or on a heads-up display, for example, can be used to alert a motorist to a potential pedestrian danger. Alternatively, graphical information can be conveyed to a motorist in combination with information from a GUI, such as information on a map of the vehicle's navigation system. Likewise, in addition to audible alerts, a pedestrian could be provided with other warnings (e.g., vibration of the mobile device 104, etc.). For example, the vehicular device 102 could cause the headlights of the vehicle 402 to flash to attract the attention of the pedestrian 406. The vehicular device 102 could also control various other mechanisms of the vehicle, such as the horn, to provide warnings for pedestrians within the warning zone 408. In case of an emergency where the danger of an imminent collision is almost certain, the vehicular device could apply the vehicle's brakes.

Regardless of whether or not an alert is provided during any iteration of the technique in FIG. 4B, the technique continuously repeats itself. The frequency of the iterations of the technique in FIG. 4B can be adjusted according to parameters, such as the speed of the mobile devices 104 within range and the vehicular device. Likewise, the frequency with which the activation signal 404 is refreshed and the frequency with which the warning zone 408 is updated can also be independently varied according to similar parameters. The constellation of the mobile devices 104 being tracked by the vehicular device 102 is constantly changing and is updated during iterations of the technique shown in FIG. 4B, as new mobile devices 104 carried by pedestrians enter or leave the transmission range of the vehicular device 102.

As the vehicle 402 shown in FIG. 4A continues traveling along the road toward the intersection, a mobile device 104 carried by the second pedestrian 410, who is initially outside of the range of the activation signal 404, will come within range be activated in response to the activation signal 404. This mobile device 104 carried by the second pedestrian 410 will then begin to transmit information regarding its position, speed, and/or bearing to the vehicular device 102 of the vehicle 402. Similarly, as the vehicle 402 continues past the first pedestrian 406, the first pedestrian's mobile device 104 will be outside of the activation signal range 404, and will subsequently become deactivated, or go dormant, until it receives an activation signal from another vehicular device 102.

The shape of the transmission pattern of the activation signal 404 can be altered or updated according to a variety of parameters, such as the operation of the vehicle 402. For example, as the vehicle 402 increases speed, the transmission pattern of the activation signal 404 can be changed (e.g., by increasing output power) to reach further in front of the vehicle. Additionally, as the vehicle 402 turns, the transmission pattern can be altered to provide additional range for the activation signal 404 in the direction of the turn being made by the vehicle 402. Additionally, the angular width of the transmission pattern of the activation signal 404 can be increased as the vehicle slows, such that additional mobile devices of laterally located pedestrians, which may be able to reach the vehicle 402 because of the vehicle's reduced speed, can be activated. Conversely, as the vehicle's speed increases, the angular width of the transmission pattern of the activation signal 404 can be narrowed, as pedestrians located laterally to the vehicle will be unable to approach the vehicle 402 quickly enough to pose any type of danger.

The quality of the warning zone 408 can also vary according to multiple parameters and can be updated at regular intervals. For example, in urban settings, the size of the warning zone 408 can be smaller by choice, as multiple pedestrians are present in and around streets but do not necessarily present any significant danger or threat of collision. Conversely, in more rural settings, the size of the warning zone 408 can be larger, as the population density is lower, and any pedestrian that might intersect the warning zone 408 could pose a potential for collision, or other potential danger. As the vehicle approaches areas that present particular danger (e.g., an intersection), the warning zone 408 can be shaped or otherwise altered to specifically warn of dangers in those areas, as shown in FIG. 4A. The warning zone 408 can also be changed in response to manipulation of one or more controls within the vehicle 402, or in response to changes of various vehicular systems, such as activation of headlights, turn signals, brakes, horn, and so on. Additionally, the warning zone 408 can be expanded as the vehicle 402 increases its speed to allow ample time for a motorist or pedestrian to react to any alerts generated by the system. Similarly, as the direction or heading of the vehicle 402 is changed, the warning zone 408 can also be altered correspondingly to best determine the likelihood of collisions.

Figure 5:
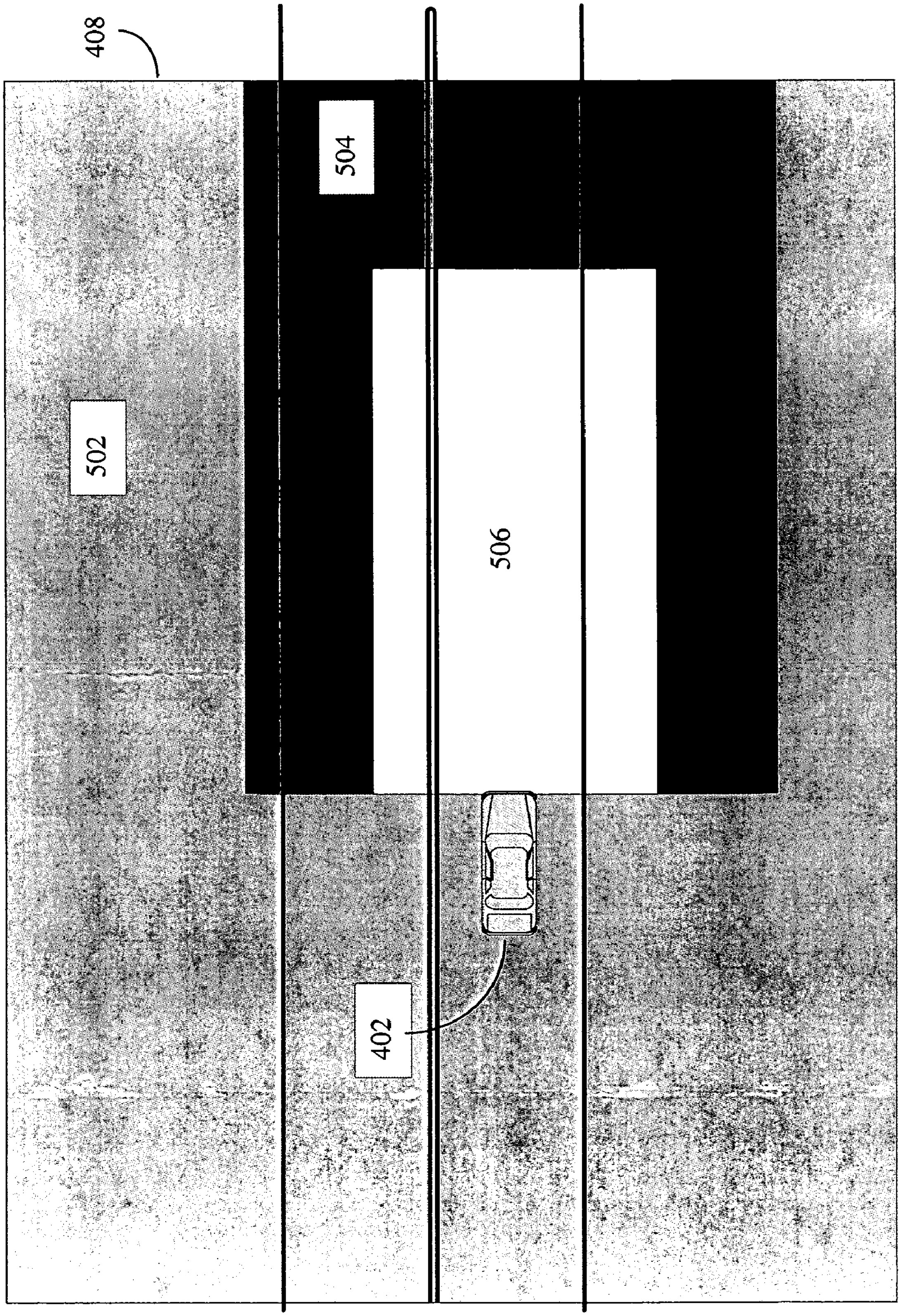
FIG. 5 is a diagram illustrating a warning zone in accordance with an embodiment of the invention.

FIG. 5 illustrates a three-tiered warning zone 408 used according to an embodiment of the invention. The first tier 502 represents areas proximate to the vehicle 402, but outside of the vehicle's range of movements. Thus, mobile devices 104 predicted to intersect this outermost tier 502 are of less concern for purposes of collisions with the vehicle 402, or other potential danger, and therefore may not generate an alert. Whether or not an alert is generated by a mobile device 104 that is likely to intersect the outermost tier 502, may depend on a variety of factors, including for example, predetermined preferences, speed of the vehicle 408, and so forth.

Mobile devices 104 predicted to intersect the second tier 504 of the warning zone 408, however, present an increased risk for a vehicle-pedestrian collision, or other danger. Therefore, a mobile device 104 predicted to intersect this second tier 504 of the warning zone 408 may generate an alert, either to the motorist of the vehicle 402 by way of the vehicular device 102, or to the pedestrian carrying the mobile device 104. Generally, alerts or warnings generated regarding mobile devices 104 predicted to intersect the second tier 504 of the warning zone are low-level warnings that are not urgent, and are intended only to increase the awareness of either the motorist or the pedestrian. These warnings may be distinguished from more urgent warnings by their pitch, color, frequency, volume, or other quality capable of communicating such differences.

The third tier 506 of the warning zone 408 is a zone of heightened danger and mobile devices 104 predicted to intersect the third tier 506 of the warning zone 408, present the highest risk of a vehicle-pedestrian collision, or other similar danger. Thus, mobile devices 104 predicted to intersect the third tier 506 generate a high-level alert or warning to be provided either to the motorist or the pedestrian using the mobile device 104.

Figure 6:
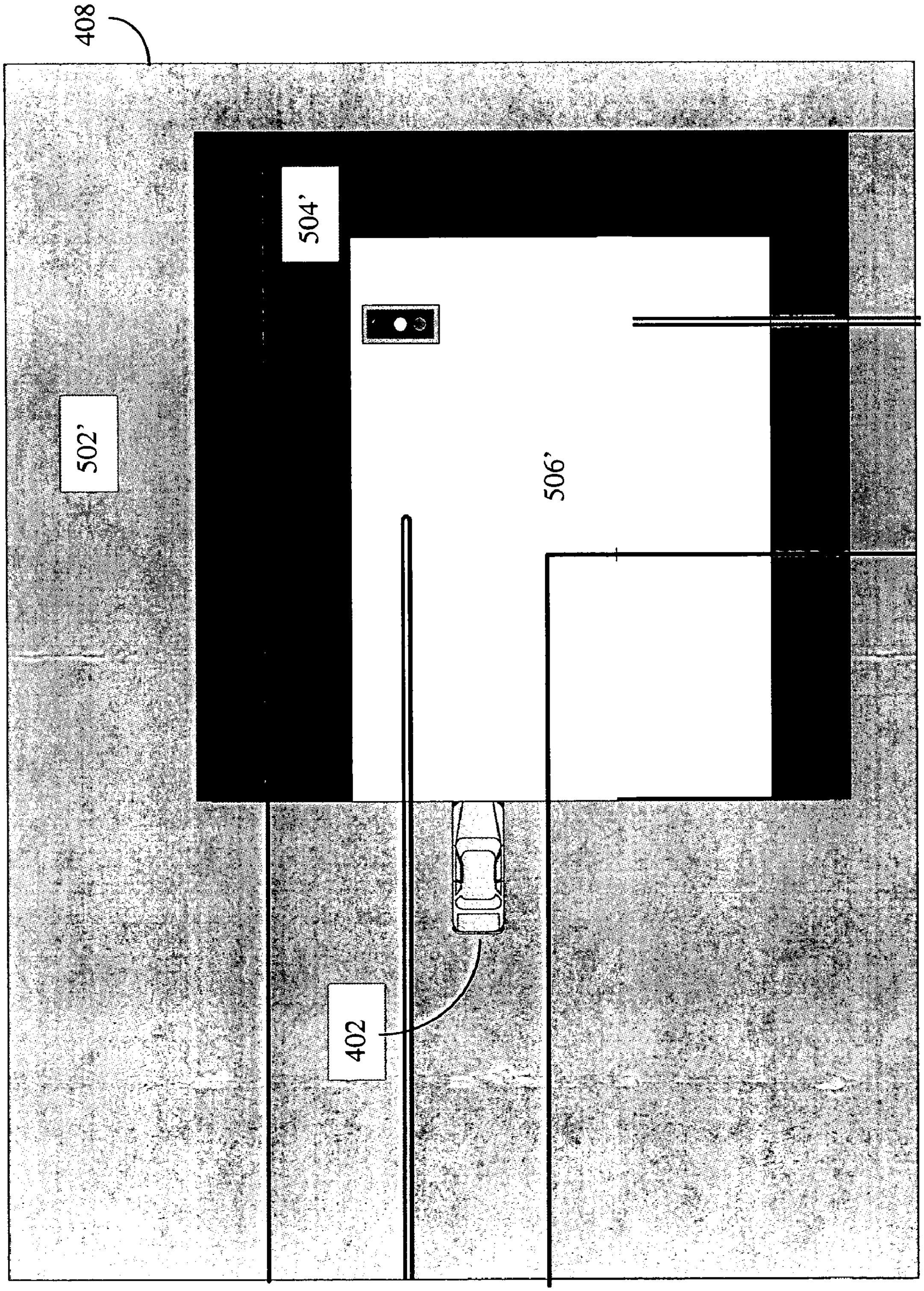
FIG. 6 is a diagram illustrating an adaptable warning zone in accordance with an embodiment of the invention.

FIG. 6 illustrates the warning zone 408 as it adapts with movements of the vehicle 402. According to an embodiment of the invention, as the vehicle 402 approaches an intersection, and intends to turn right, the warning zone 408 can be adapted, such that the three tiers are shifted in the direction of intended turn, as shown in FIG. 6. The warning zone 408 can be adapted according to at least one of multiple signals or occurrences, such as activation of the right turn signal, slowing of the vehicle 402 while beginning to move the vehicle 402 to the right, or other cues. The three tiers of the warning zone 408 shown in FIG. 6 correspond to the three tiers of the warning zone 408 shown in FIG. 5, and are denoted by the same numerals having a "prime" designation after the number (i.e., tiers 502', 504', and 506'). During the execution of a left-hand turn, the warning zone 408 would be shifted to the left of the vehicle 402 in a manner symmetric to the shift shown in FIG. 6

FIGS. 7–15 illustrate aspects of three individual scenarios in which the system and method of the present invention track relative positions of a vehicle using a vehicular device 102 and a pedestrian carrying a mobile device 104, predict future positions of the vehicle and the pedestrian, and generate alerts or warnings if the pedestrian is predicted to be in a position that is likely to cause a vehicle-pedestrian collision. The warning level generated in each of the three scenarios depends on the likelihood of the pedestrian intersecting a warning zone near the vehicle. Each scenario involves a pedestrian walking near the path of a vehicle. The pedestrian's path makes a different angle with the vehicle's path in each scenario: approximately 90 degrees in the first scenario, approximately 45 degrees in the second scenario, and approximately zero degrees (i.e., a parallel, non-intersecting path) in the third scenario.

Figure 7A:
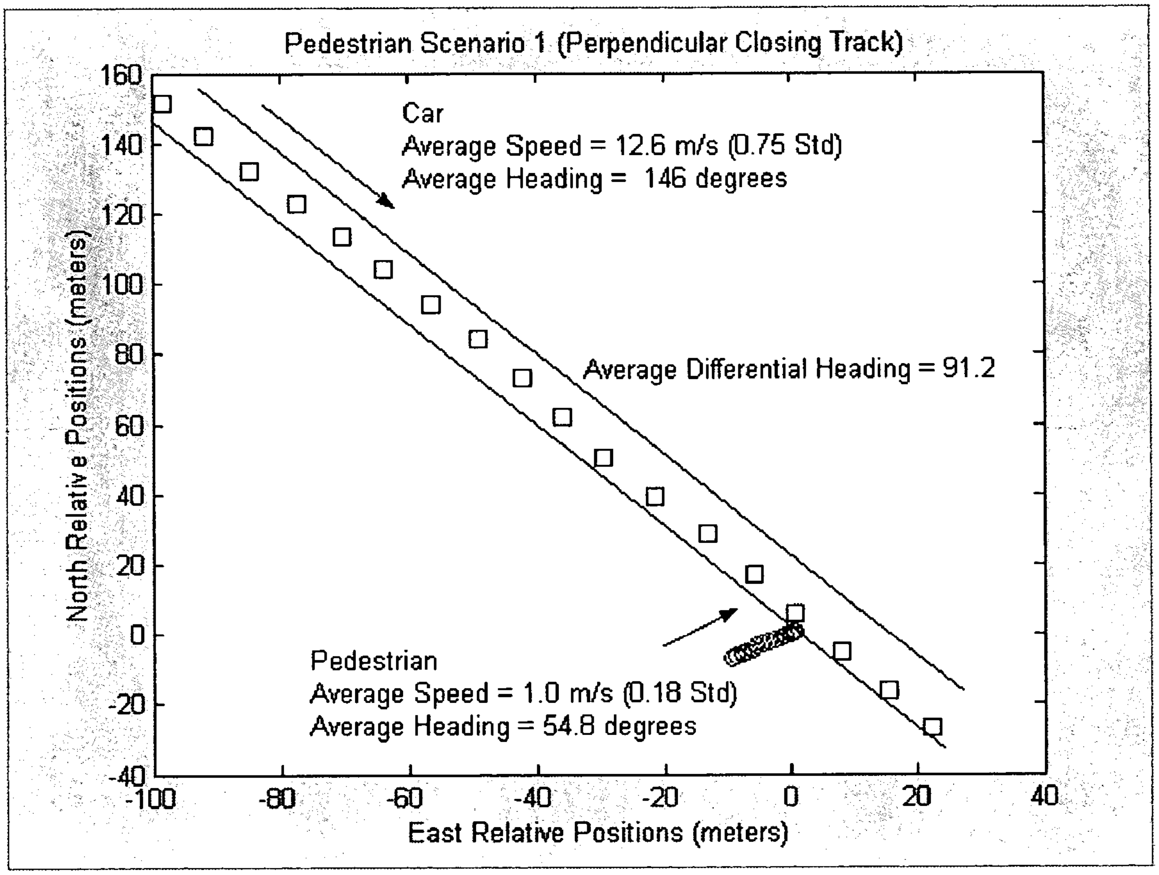
FIG. 7A is a plot showing positions of a vehicle and a pedestrian according to a first scenario.

FIG. 7A is a plot showing positions of a vehicle using a vehicular device 102 and a pedestrian using a mobile device 104 according to a first scenario where the pedestrian is closing on a path at an angle that is nearly perpendicular to the path of the vehicle. The positions of the vehicle are shown at discrete time intervals, or "time marks," as squares within two parallel lines that represent the lane in which the vehicle is traveling. The discrete positions of the pedestrian are shown as circles at corresponding time marks. Thus, each square represents the location of the vehicle at a specific time, and each circle represents the position of the pedestrian at a corresponding specific time. The vehicular device 102 and the mobile device 104 may implement various precise methods of measuring time to maintain synchronicity between the devices. According to an embodiment of the invention, time measured on one device may be transmitted to the other device along with other information being communicated between the devices. In accordance with an embodiment of the invention that make use of GPS or similar reference signals, the time received with these signals can be used by both the vehicular device 102 and the mobile device 104 so that both devices have a common, accurate time reference.

The average speed of the vehicle in FIG. 7A is 12.6 meters per second (m/s) (with a standard deviation of 0.75), and its average heading is 146 degrees. The average speed of the pedestrian is 1.0 m/s (with a standard deviation of 0.18), and the pedestrian's average heading is 54.8 degrees. Thus, the average differential heading between the vehicle and pedestrian is 91.2 degrees (i.e., their paths are approximately perpendicular). The relative East position is shown in meters along the x-axis and the relative North position is shown in meters along the y-axis. From the view shown in FIG. 7A, it appears that the generally Southeast path of the vehicle and the generally Northeast path of the pedestrian are likely to intersect, and that a vehicle-pedestrian collision is probable.

Figure 7B:
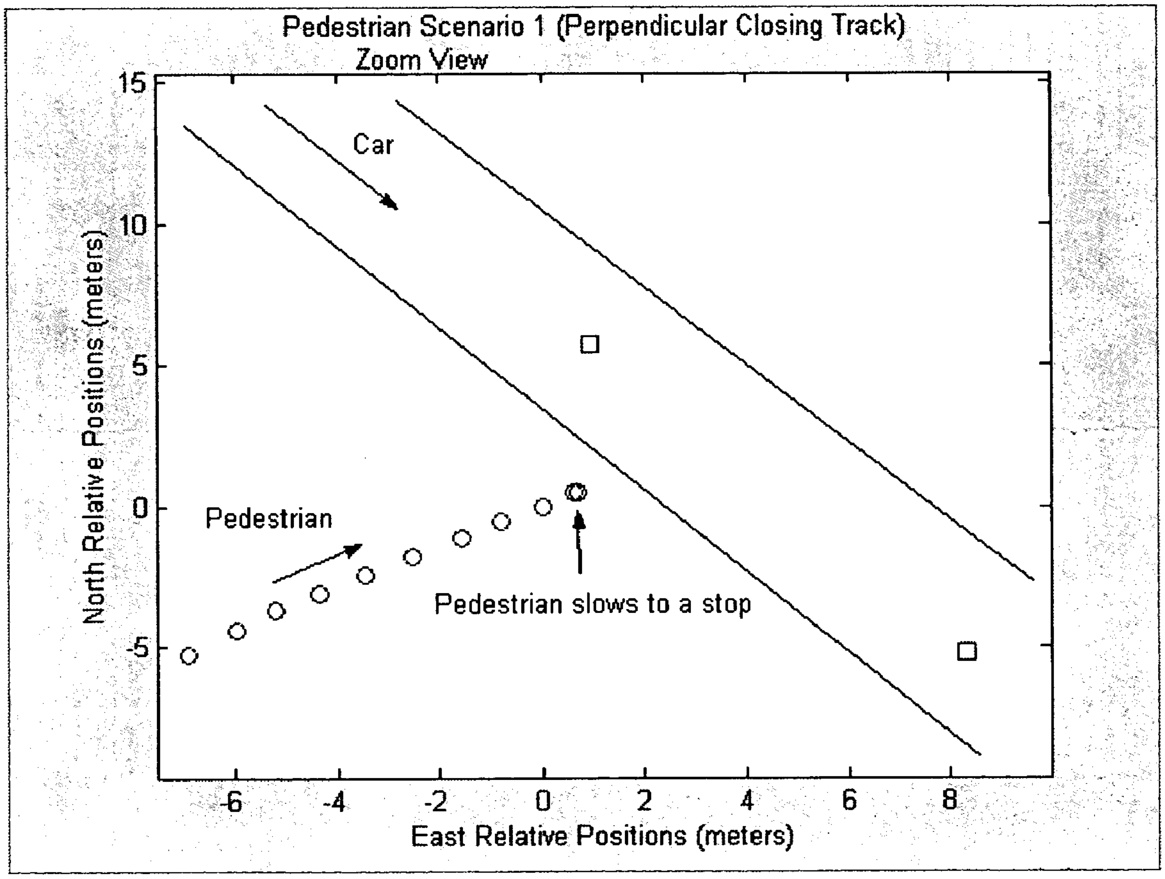
FIG. 7B is a plot showing a close-up view of the positions of a vehicle and a pedestrian according to a first scenario.

FIG. 7B is a plot showing a close-up view of the positions of the vehicle and the pedestrian according to the first scenario. Because of the enlarged view of the last positions of the pedestrian that are recorded, it is possible to discern that the pedestrian actually slows to a stop before intersecting the path of the vehicle. Thus, the possibility of collision, which may have seemed highly probable at earlier time marks corresponding to earlier positions of the pedestrian (before the pedestrian began to slow down), seems unlikely during the time marks of the pedestrian's last positions shown in detail in FIG. 7B. Because of the late change in the pedestrian's speed, the first scenario may represent a pedestrian headed for collision and changing speed to avoid a collision after noticing the vehicle at the last moment, or a situation where a pedestrian headed for a collision changes speed at the last moment because of an alert received via the mobile device 104.

Figure 8A:
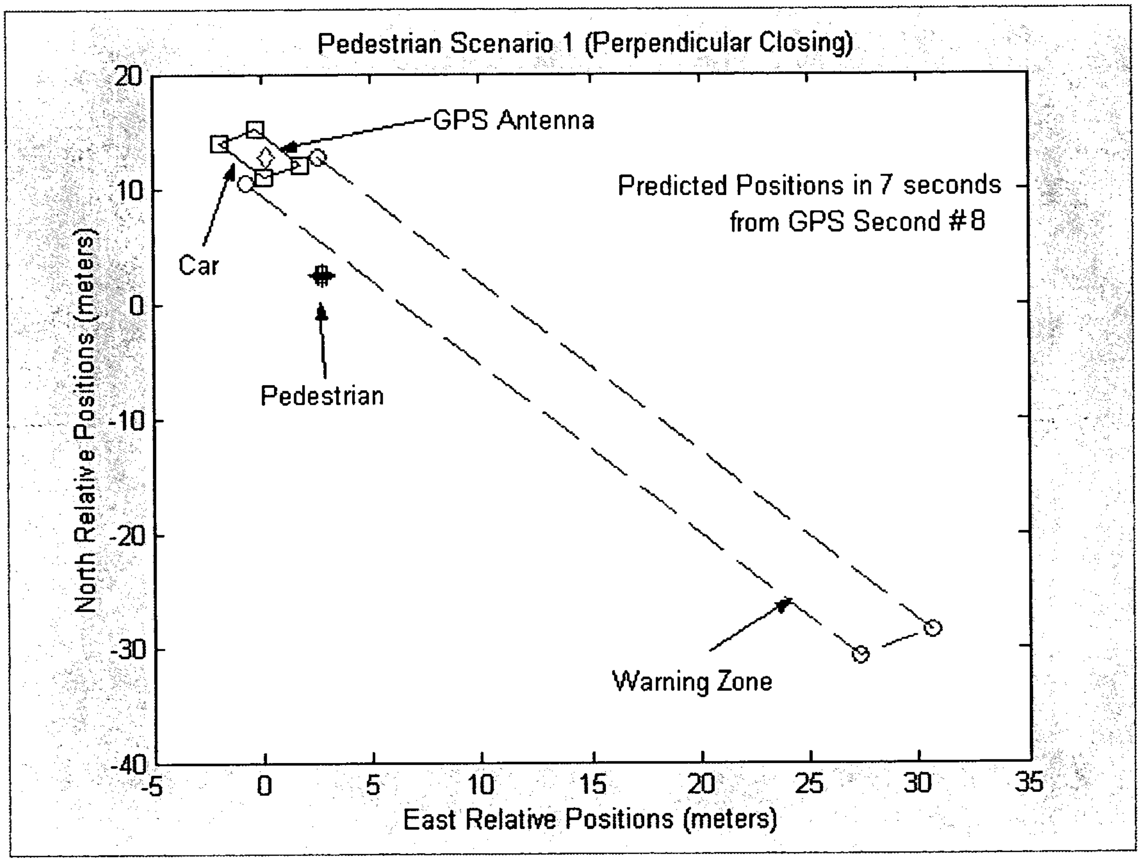
FIG. 8A illustrates a prediction of the position of a pedestrian relative to the position of a vehicle according to a first scenario.

FIG. 8A illustrates a prediction of the position of the pedestrian relative to the position of the vehicle according to the first scenario. In FIG. 8A, the vehicle is shown along with a warning zone (indicated by the broken-lined parallelogram having a circle at each vertex) that extends in front of the vehicle, in the direction in which the vehicle is traveling. The warning zone represents the area of greatest danger to pedestrians, and pedestrians predicted to intersect this warning zone generate alerts of a probable vehicle-pedestrian collision or other potential danger.

FIG. 8A shows the predicted position of the pedestrian (indicated by a unique shape labeled in the Figure) seven seconds in the future from a time mark of eight seconds (as measured by a GPS time signal) after the pedestrian's mobile device 104 was first detected by the vehicular device 102 (represented in FIG. 8A by the label "GPS Antenna") of the vehicle. As can be seen in the FIG. 8A, at this point, the pedestrian is predicted to approach the warning zone in the next seven seconds (i.e., at a time mark of 15 seconds from the time the pedestrian's mobile device 104 was first detected), but is not predicted to intersect the warning zone.

Figure 8B:
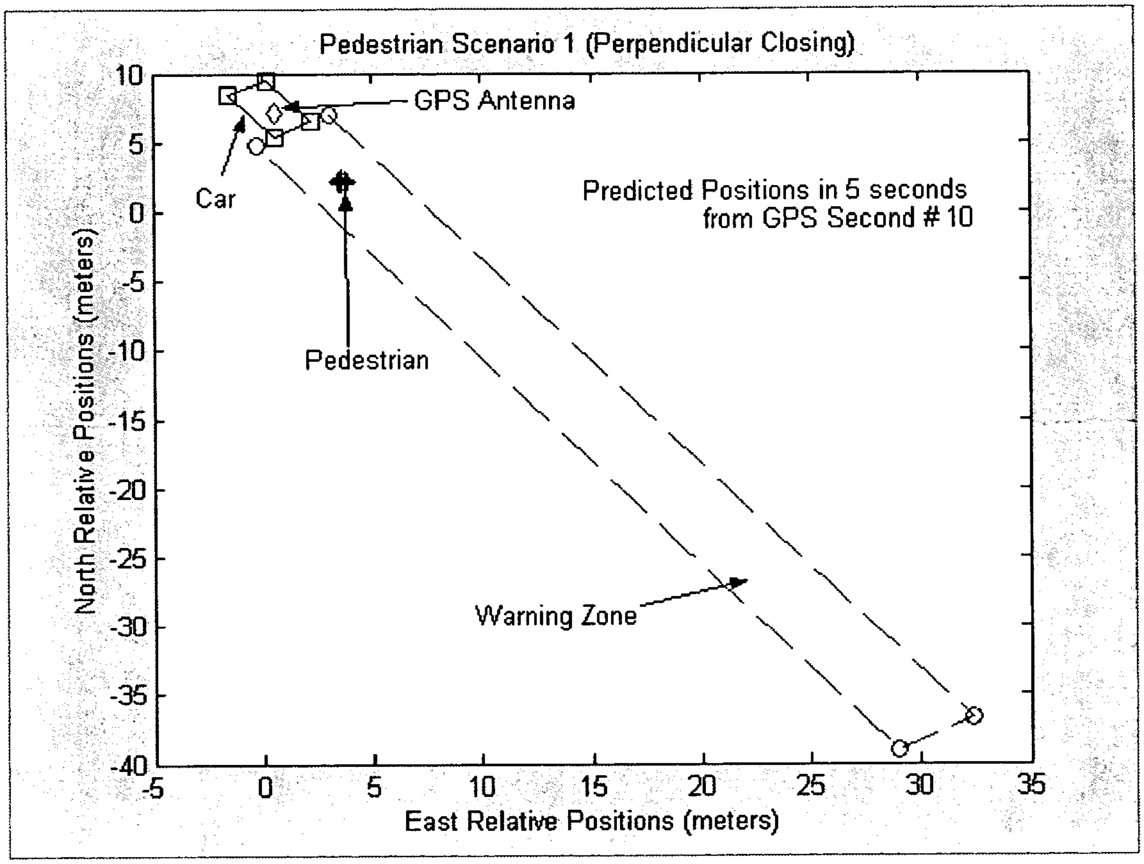
FIG. 8B illustrates a prediction of the position of a pedestrian relative to the position of a vehicle according to a first scenario.

FIG. 8B shows the predicted position of the pedestrian five seconds in the future from a time mark of 10 seconds (i.e., at a time mark of 15 seconds) after the pedestrian's mobile device 104 was first detected. As can be seen in the FIG. 8B, the pedestrian is predicted to intersect the warning zone of the vehicle in five seconds in the future, and thus may cause a vehicle-pedestrian collision at that time.

Figure 8C:
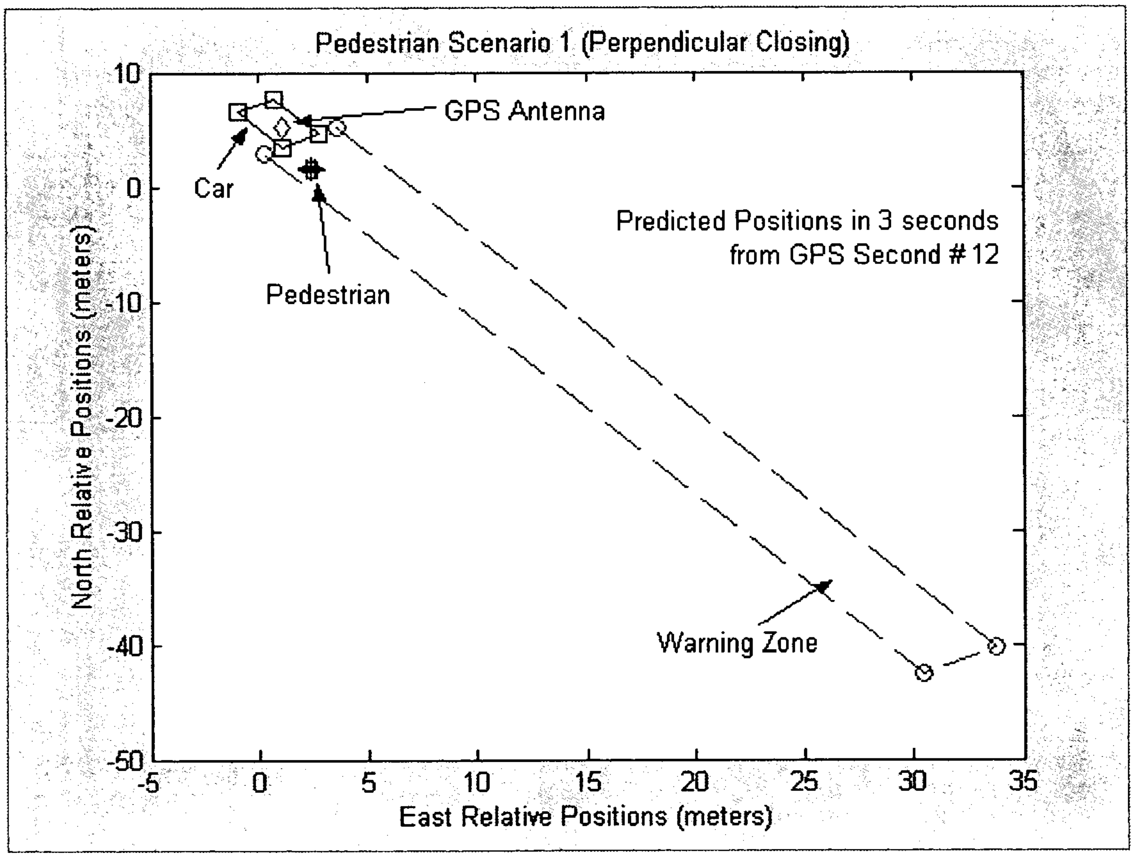
FIG. 8C illustrates a prediction of the position of a pedestrian relative to the position of a vehicle according to a first scenario.

FIG. 8C shows that the pedestrian is predicted to intersect the warning zone three seconds in the future from a time mark of 12 seconds (i.e., at a time mark of 15 seconds) after the pedestrian's mobile device 104 was first detected. Thus, FIG. 8C appears to show that a collision is likely imminent within three seconds.

Figure 8D:
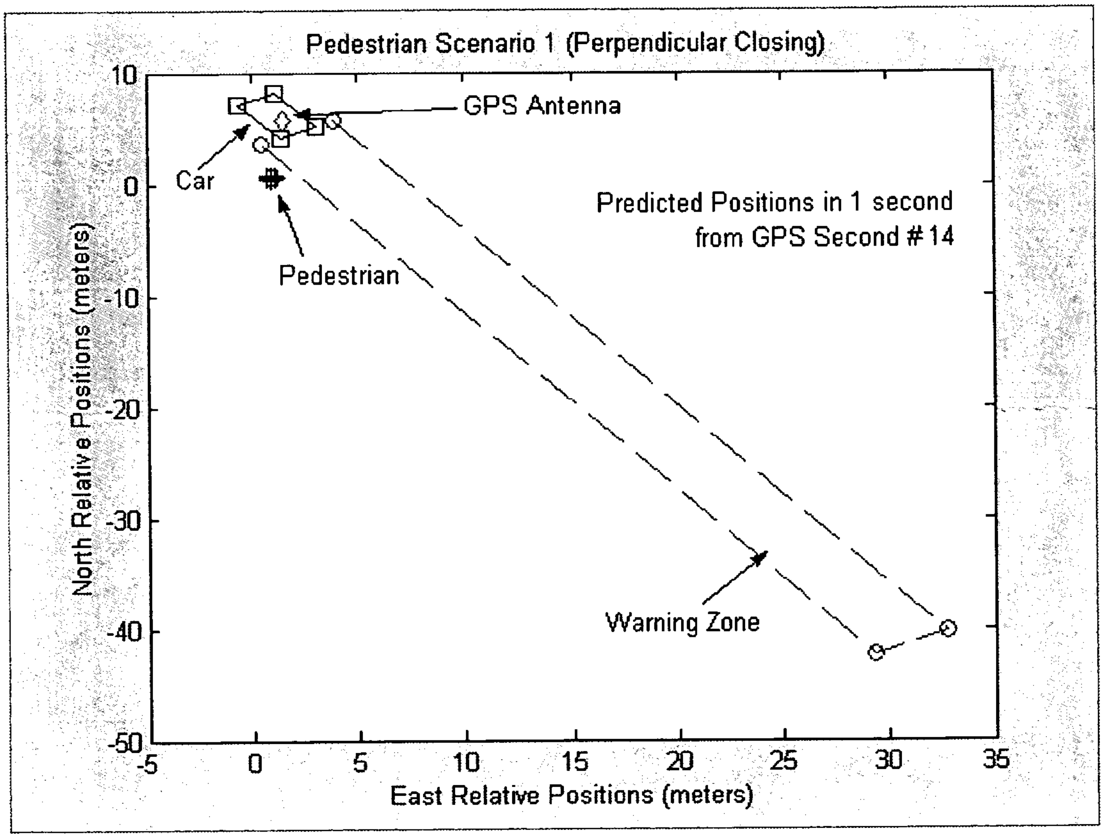
FIG. 8D illustrates a prediction of the position of a pedestrian relative to the position of a vehicle according to a first scenario.

However, as FIG. 8D illustrates, the pedestrian is predicted not to intersect the warning zone just one second in the future from a time mark of 14 seconds (i.e., at a time mark of 15 seconds) after the pedestrian's mobile device 104 was first detected. This is because, as shown in FIG. 7B, the pedestrian's speed is slowing to a stop, and the system is able to measure the pedestrian's slowing speed and determine that the pedestrian will probably not intersect the warning zone. Thus, depending on the pedestrian's predicted proximity to the warning zone, the system of the invention may generate a low-level warning about the pedestrian, or may generate no warning at all.

Figure 9:
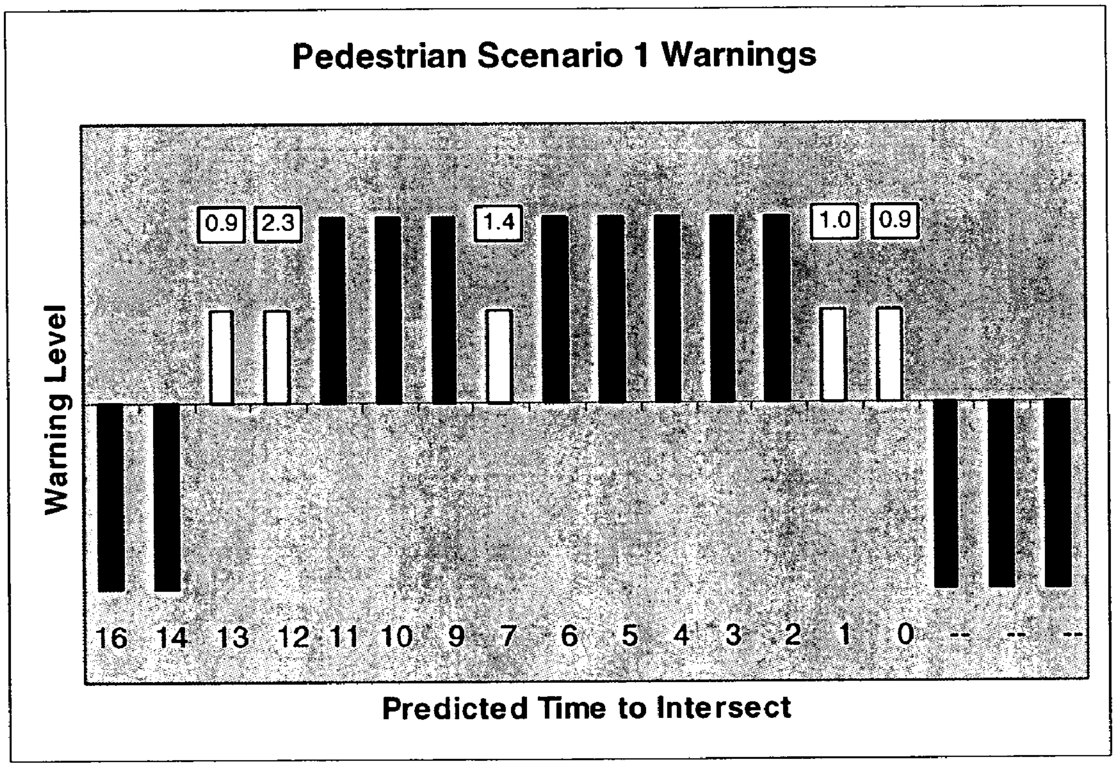
FIG. 9 is a plot of warning levels associated with predictions of the position of a pedestrian relative to the position of a vehicle according to a first scenario.

FIG. 9 is a plot of warning levels at each time mark until (and beyond) the predicted time of intersection or nearest approach of the pedestrian and the vehicle's warning zone according to the predictions of the position of the pedestrian relative to the position of the vehicle in the first scenario. The warning level is shown on the y-axis, and the predicted time to intersection is shown in seconds on the x-axis.

The plot shown in FIG. 9 represents a three-tiered warning system for generating alerts or warnings. Bars shown below the horizontal line in the plot represent the lowest state of alert, indicating that no intersection between the pedestrian and the vehicle's warning zone is predicted. Full bars shown above the horizontal line represent the highest state of alert, indicating that an intersection is highly likely. Half bars shown above the horizontal line represent a middle alert tier, indicating that an intersection will probably not occur, but that caution is warranted as an intersection could still happen. Above each of the half bars representing the middle alert tier is a box containing a number that indicates the distance (in meters) between the warning zone and the pedestrian's predicted location at the point of nearest approach. Although only three alert levels are shown in FIG. 9, some embodiments of the invention can make use of any number of alert levels.

In FIG. 9, the pedestrian will generate the highest state of alert during most of the time marks shown. As the pedestrian begins to slow, about two seconds prior to the point of nearest approach, the alert state is lowered to the middle tier, and the pedestrian is predicted to remain approximately one meter outside of the warning zone.

The plot shown in FIG. 9 tracks the warning level for the pedestrian for approximately 16 seconds prior to the predicted point of the pedestrian's nearest proximity to the vehicle. Although the capabilities of the system may vary, and performance can be adjusted and optimized for various applications, according to some embodiments of the invention, people are generally detected approximately 20 to 25 seconds before the time of closest proximity between the vehicular device 102 carried by the vehicle and the mobile device 104 carried by the pedestrian. According to other embodiments of the invention, pedestrians are detected between about 1 to 10 seconds before the time of closest proximity with a vehicle 402. The time during which the mobile devices are tracked and the frequency of that tracking can vary according to the speeds of the vehicle 402 and the pedestrian, and various design parameters and desired performance of the system.

According to an embodiment of the invention, emergency alerts may be provided to motorists approximately four seconds prior to an anticipated collision or other danger. In the first scenario shown in FIG. 9, therefore, an alert might be generated at approximately four seconds prior to the predicted intersection. That alert could be cancelled or at reduced to a lower-level alert at approximately two seconds prior to the predicted time of nearest approach. Timing of alerts can be varied according to multiple parameters, including predetermined parameters, user-determined parameters, self-learned parameters, and so forth. For example, a user having a slower reaction time or traveling at a higher rate of speed could require a longer warning period, as determined by a user-defined parameter or a self-learned parameter.

Figure 10A:
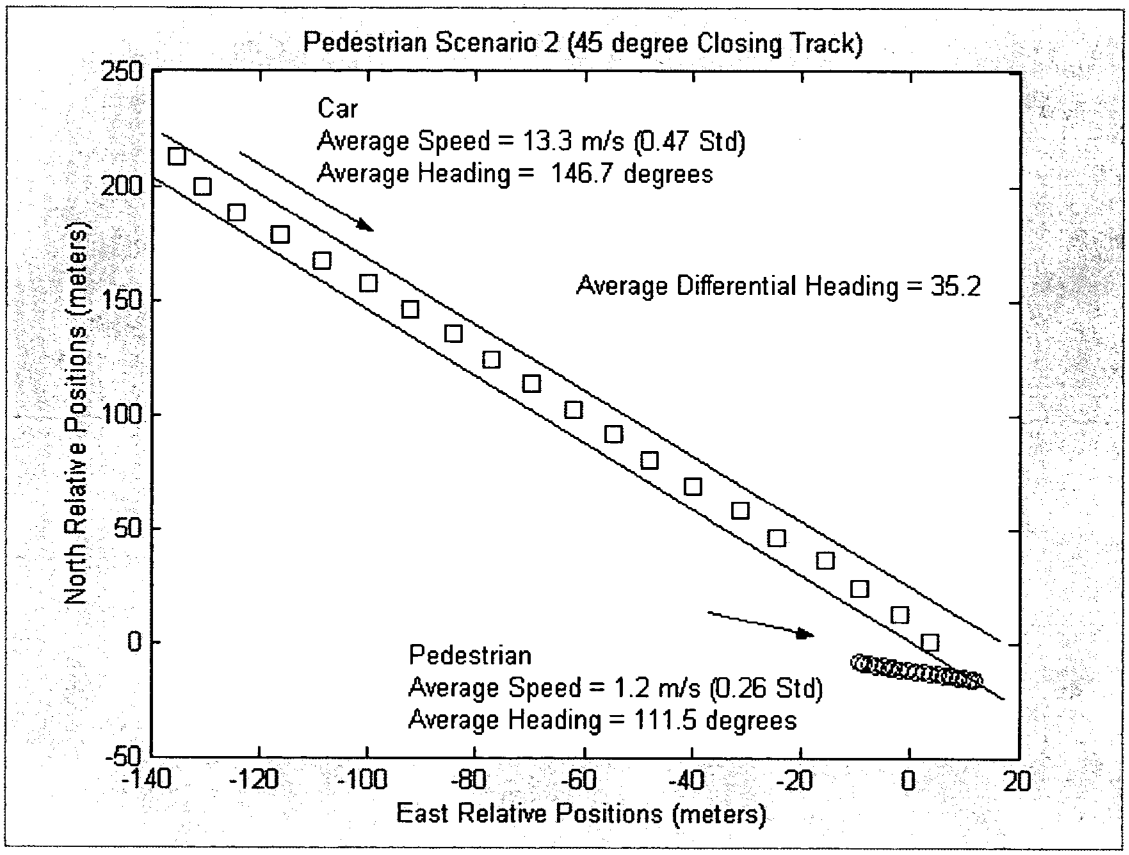
FIG. 10A is a plot showing positions of a vehicle and a pedestrian according to a second scenario.

FIG. 10A is a plot showing positions of a vehicle using a vehicular device 102 and a pedestrian using a mobile device 104 according to a second scenario where the pedestrian is closing on a path at an angle of approximately 45 degrees to the path of the vehicle. The average speed of the vehicle is 13.3 m/s (with a standard deviation of 0.47), and its average heading is 146.7 degrees. The average speed of the pedestrian is 1.2 m/s (with a standard deviation of 0.26), and the pedestrian's average heading is 111.5 degrees. Thus, the average differential heading between the vehicle and pedestrian is 35.2 degrees (i.e., their paths make an angle of approximately 45 degrees). From the view shown in FIG. 10A, it appears that the path of the vehicle and the path of the pedestrian are likely to intersect, and that a vehicle-pedestrian collision is probable.

Figure 10B:
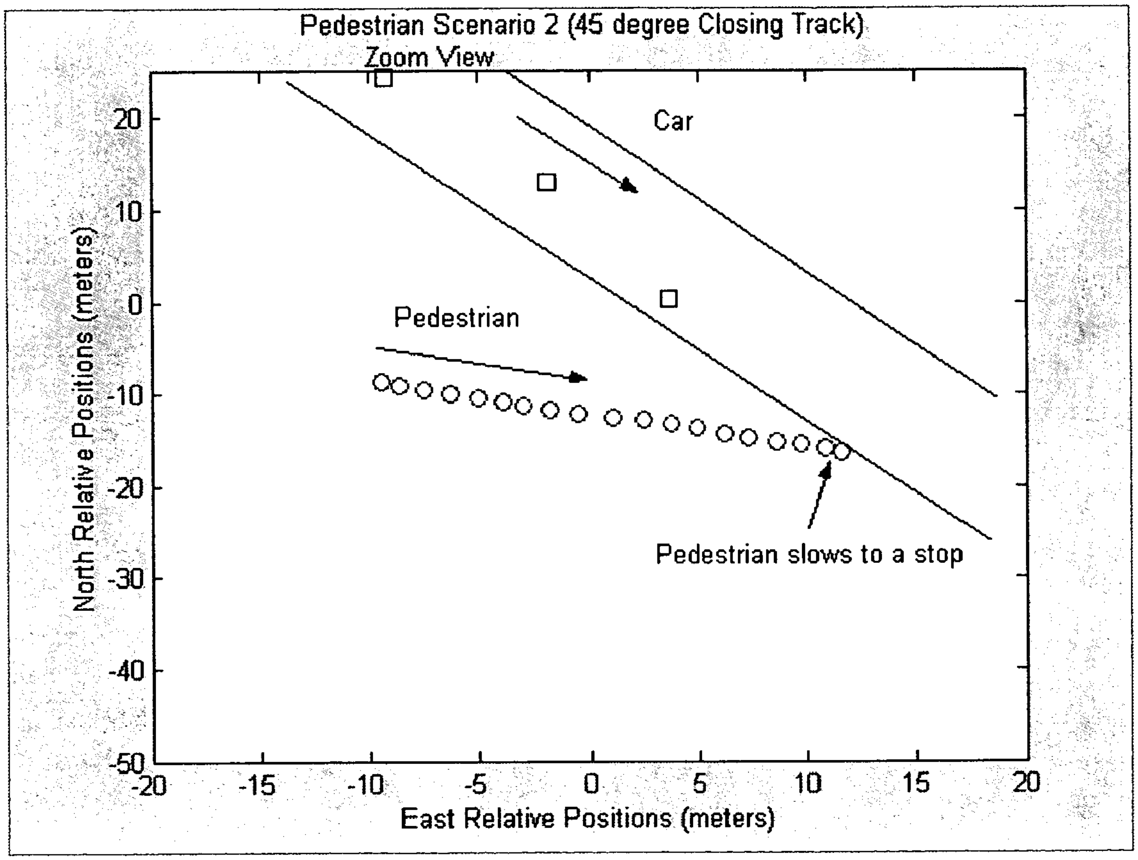
FIG. 10B is a plot showing a close-up view of the positions of a vehicle and a pedestrian according to a second scenario.

FIG. 10B is a plot showing a close-up view of the positions of the vehicle and the pedestrian according to the second scenario. Because of the enlarged view of the last positions of the pedestrian that are recorded, it is possible to see that the pedestrian actually slows to a stop and changes headings before intersecting reaching the path of the vehicle. Thus, the possibility of collision, which may have seemed highly probable at earlier time marks corresponding to earlier positions of the pedestrian, seems unlikely during the time marks of the last positions of the pedestrian shown in detail in FIG. 10B. Because of the pedestrian's sudden change in speed and heading, the second scenario may represent a situation where the pedestrian did not see the vehicle until the last moment, or did not see the vehicle and changed speed and heading in response to an alert received by the pedestrian.

Figure 11:
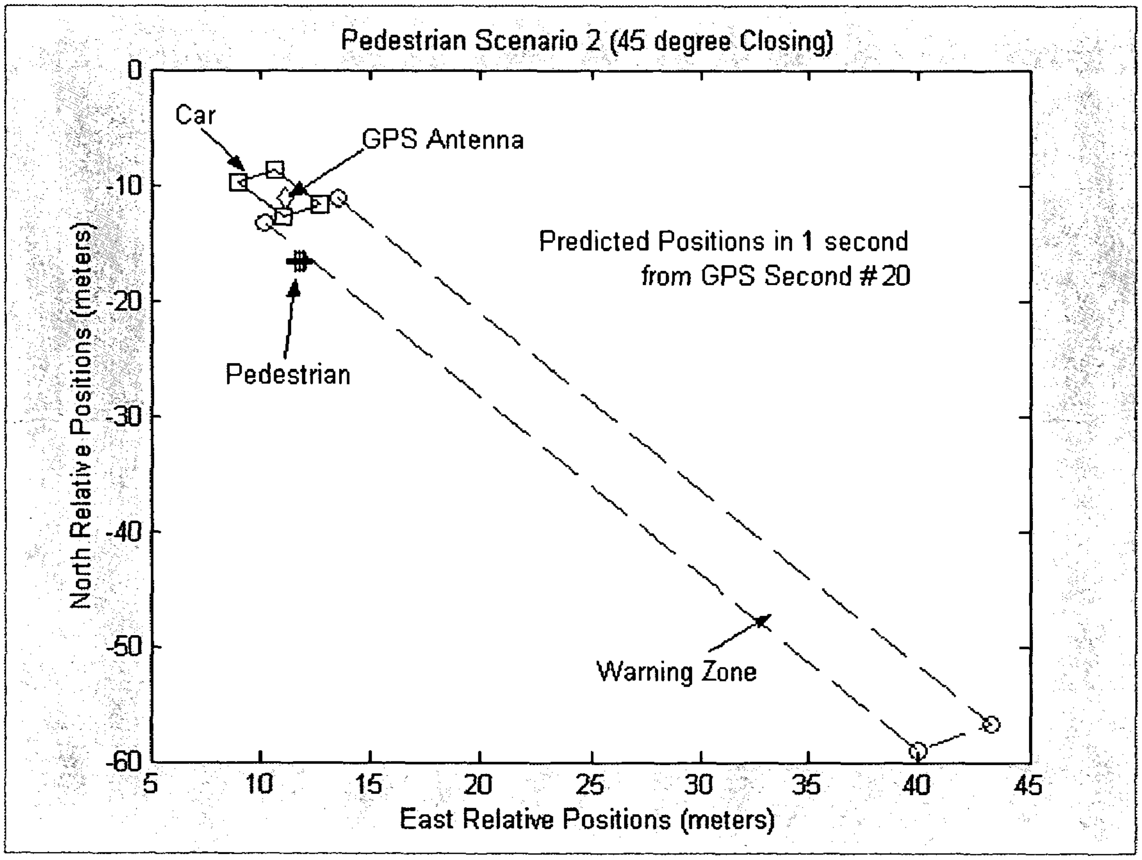
FIG. 11 illustrates a prediction of the position of a pedestrian relative to the position of a vehicle according to a second scenario.

FIG. 11 illustrates a prediction of the position of the pedestrian relative to the position of the vehicle according to the second scenario. In FIG. 11, the vehicle is shown along with a warning zone that extends in front of the vehicle, in the direction in which the vehicle is traveling. FIG. 11 shows the predicted position of the pedestrian one second in the future from a time mark of 20 seconds (as measured by a GPS time signal) after the pedestrian's mobile device 104 was first detected by the vehicular device 102 of the vehicle. As can be seen in the FIG. 11, at this point, the pedestrian is predicted to approach the warning zone one second in the future (i.e., at a time mark of 21 seconds from the time the pedestrian's mobile device 104 was first detected), but is not predicted to intersect the zone.

Figure 12:
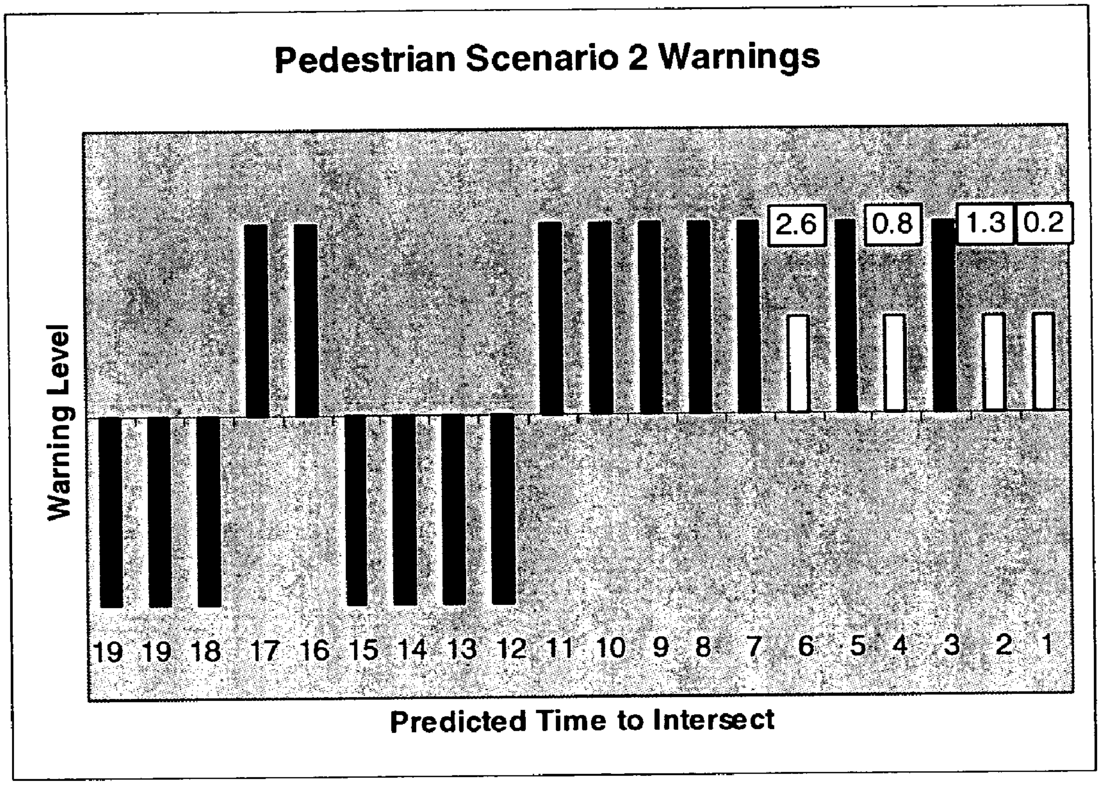
FIG. 12 is a plot of warning levels associated with predictions of the position of a pedestrian relative to the position of a vehicle according to a second scenario.

FIG. 12 is a plot of warning levels at each time mark until the predicted time of intersection or nearest approach of the pedestrian and the vehicle's warning zone according to the predictions of the position of the pedestrian relative to the position of the vehicle in the second scenario. The pedestrian generates several warnings in this plot having the highest state of alert. As the pedestrian begins to slow and change headings, however, the alert state is lowered to the middle tier, and the pedestrian is predicted to remain approximately one meter outside of the warning zone. Thus, the system can issue alerts according to the highest level and the middle-tier level, depending upon the specific parameters of the system.

Figure 13:
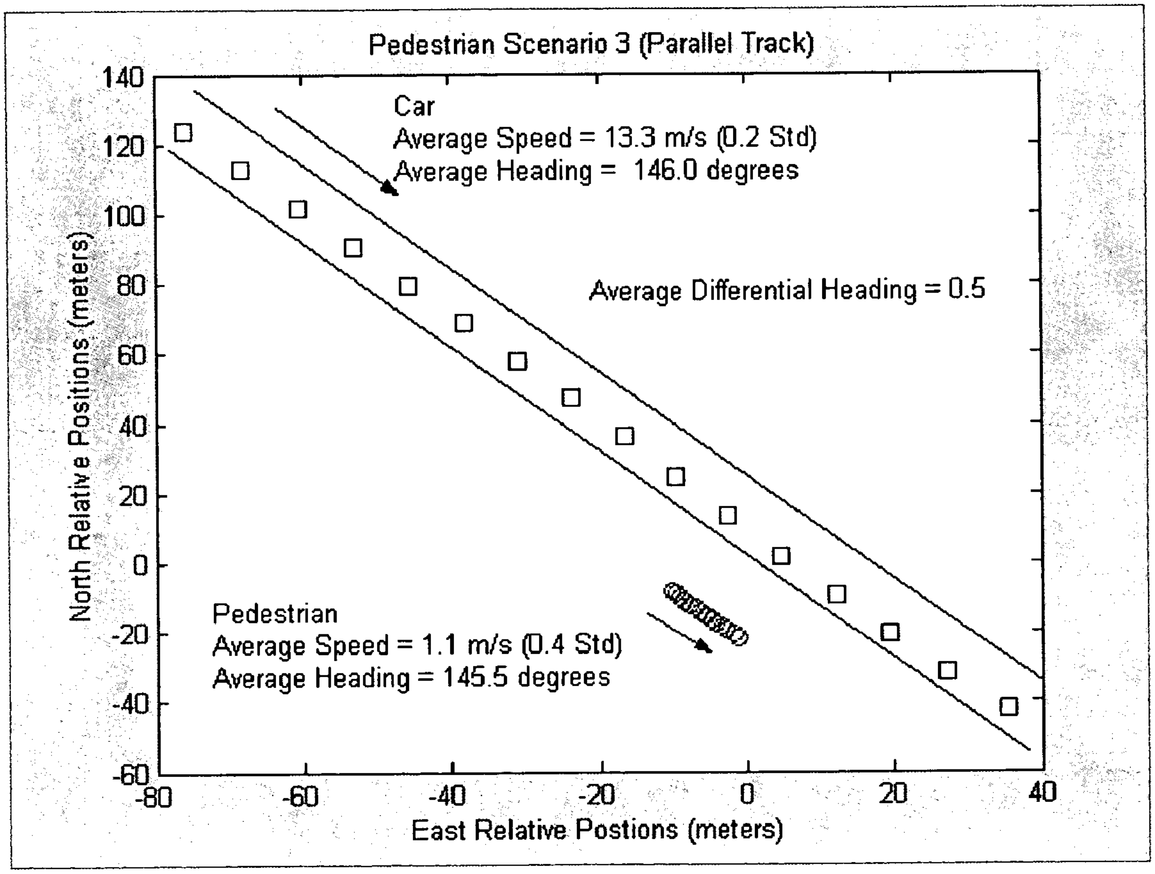
FIG. 13 is a plot showing positions of a vehicle and a pedestrian according to a third scenario.

FIG. 13 is a plot showing positions of a vehicle using a vehicular device 102 and a pedestrian using a mobile device 104 according to a third scenario where the pedestrian is moving along a path at an angle that is approximately parallel to the path of the vehicle. The average speed of the vehicle is 13.3 m/s (with a standard deviation of 0.2), and its average heading is 146.0 degrees. The average speed of the pedestrian is 1.1 m/s (with a standard deviation of 0.4), and the pedestrian's average heading is 145.5 degrees. Thus, the average differential heading between the vehicle and pedestrian is 0.5 degrees (i.e., their paths are approximately parallel). From the view shown in FIG. 13, it is apparent that the path of the vehicle and the path of the pedestrian will not intersect, and that a vehicle-pedestrian collision is highly improbable.

Figure 14:
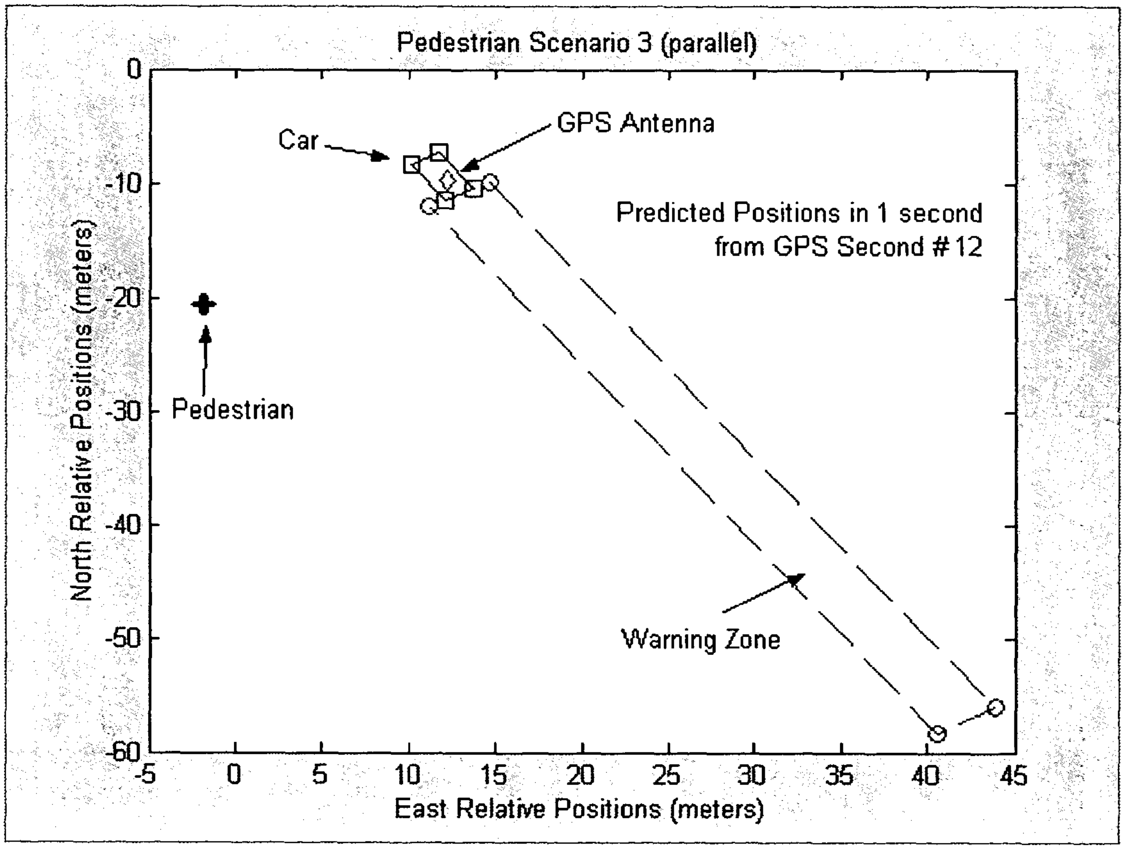
FIG. 14 illustrates a prediction of the position of a pedestrian relative to the position of a vehicle according to a second scenario.

FIG. 14 illustrates a prediction of the position of the pedestrian relative to the position of the vehicle according to the third scenario. In FIG. 14, the vehicle is shown along with a warning zone that extends in front of the vehicle, in the direction in which the vehicle is traveling. FIG. 14 shows the predicted position of the pedestrian one second in the future from a time mark of 12 seconds (as measured by a GPS time signal) after the pedestrian's mobile device 104 was first detected by the vehicular device 102 of the vehicle. As can be seen in the FIG. 14, at this point, the pedestrian is predicted to be outside the warning zone one second in the future (i.e., at a time mark of 13 seconds from the time the pedestrian's mobile device 104 was first detected), which is the time mark of nearest approach.

Figure 15:
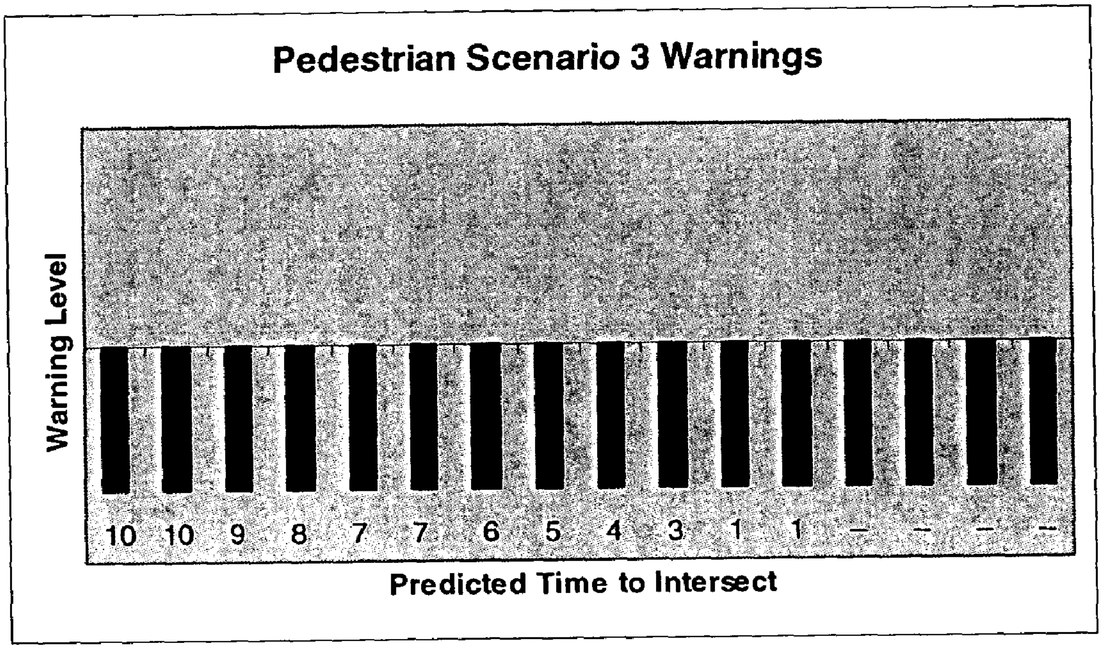
FIG. 15 is a plot of warning levels associated with the predictions of the position of a pedestrian relative to the position of a vehicle according to a second scenario.

FIG. 15 is a plot of warning levels at each time mark until the predicted time of nearest approach of the pedestrian and the vehicle's warning zone according to the predictions of the position of a pedestrian relative to the position of a vehicle in the third scenario. In this case, the pedestrian does not generate any high-level or middle-level alerts, but instead generates all low-level alerts. Thus, in the third scenario, the system may continue to monitor the pedestrian as a source of future potential danger, but will not provide any warnings or alerts regarding the pedestrian.

Figure 16:
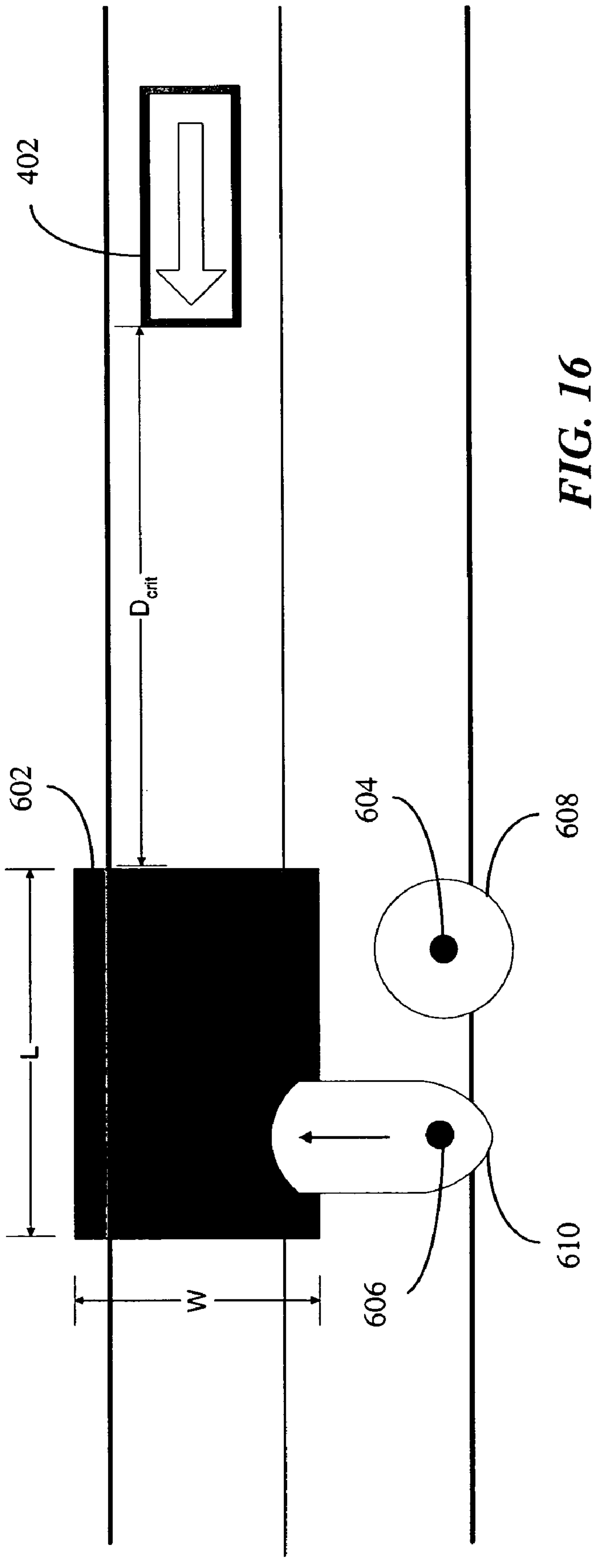
FIG. 16 is a diagram illustrating various aspects of an embodiment of the invention.

FIG. 16 is a diagram illustrating various aspects of an embodiment of the invention. In particular, FIG. 16 illustrates the manner in which some embodiments of the invention predict the likelihood of a collision between a vehicle and a pedestrian. The calculations described in connection with FIG. 16 can be executed, for example, by the predictive processor 210 shown in FIG. 2A or the controller 216 shown in FIG. 2B.

In FIG. 16, a vehicle 402 moves in a direction indicated by the arrow shown on the vehicle 402. The future position of the vehicle 402 is shown as a "vehicle space" 602 that includes the most likely position of the vehicle at some critical time $T_{crit}$ in the future. The critical time $T_{crit}$ is the amount of time in seconds before a projected collision that a driver receives a high-priority warning, indicating the possibility of an imminent collision or other danger. This critical time $T_{crit}$ is related to the reaction time of the driver of the vehicle 402, such that the driver receiving an alert $T_{crit}$ seconds before a predicted collision will have sufficient time to react and avoid the collision. As described above, the reaction time of a driver can be pre-determined by measurement, or the vehicular device 102 can dynamically determine the reaction time of the driver.

A stationary first pedestrian 604 and a moving second pedestrian 606 are shown in the area of the vehicle space 602. The second pedestrian 606 is moving toward the vehicle space 602, as indicated by the arrow. The future positions of each of the pedestrians are indicated by surrounding "pedestrian spaces" that circumscribe all positions the pedestrians are likely to occupy within a single time mark. The stationary first pedestrian 604, for example, is surrounded by a circular pedestrian space 608, which shows that the first pedestrian 604 could move a given distance in any direction before the next position measurement is taken at the next time mark. The moving second pedestrian 606, although equally likely to move in any direction prior to the next position measurement, is not capable of moving with an equal velocity in all directions. Thus, the pedestrian space 610 of the second pedestrian 606 is irregularly shaped, according to the second pedestrian's ability to move in various directions with differing velocities within a single update cycle (i.e., prior to the next measurement at the next time mark).

As can be seen in FIG. 16, the pedestrian space 610 of the second pedestrian 606 overlaps the vehicle space 602, indicating that a collision between the second pedestrian 606 and the vehicle 402 is possible or likely. The pedestrian space 608 of the first pedestrian 604, however, does not intersect or overlap the vehicle space 602, indicating that a collision between the first pedestrian 604 and the vehicle 402 is unlikely.

The vehicle space 602 is a critical distance $D_{crit}$ in feet from the current position of the vehicle 402. This critical distance $D_{crit}$ represents the distance from the vehicle 402 to a potential collision, or the distance the vehicle 402 will travel within the critical time $T_{crit}$. The critical distance $D_{crit}$ can be determined using the critical time $T_{crit}$ and the speed of the vehicle $V_{veh}$ in feet per second (f/s) according to relationship shown in Equation 1 below.

$$D_{crit}=V_{veh}\cdot T_{crit} \tag{1}$$

It should be recognized that the values used to determine the critical distance $D_{crit}$ in Equation 1 assume a relatively constant velocity over the sampling period. In situations where the vehicle 402 is accelerating, however, this acceleration can be accounted for according to known techniques to determine the critical distance $D_{crit}$ at any given time. Additionally, the instantaneous critical distance $D_{crit}$ could be determined for a number of discrete time marks according to known techniques.

The width W in feet of the vehicle space 602 (i.e., the dimension of the vehicle space 602 normal to the path of the vehicle 402) is a function of the width $W_{veh}$ of the vehicle 402 in feet and any error $\epsilon$ or uncertainty of the positioning system's measurements. Additionally, a safety factor $S_f$ can be used to widen the vehicle space 602. As the safety factor is increased, so is the width W of the vehicle space 602. The safety factor $S_f$ can be predetermined based upon the desired additional safety of the system of the invention, or can be based on other factors, such as age of the driver, or the like. Equation 2 below shows the relationship between the width W of the vehicle space 602 and the related parameters.

$$W=S_f(\epsilon+W_{veh}) \quad (2)$$

The length L in feet of the vehicle space 602 (i.e., the dimension of the vehicle space 602 along the path of the vehicle 402) is a function of the distance the vehicle travels in the time it takes a pedestrian 606 to traverse a distance equal to the width $W_{veh}$ of the vehicle 402. The time it takes the pedestrian 606 to travel this distance is determined by dividing the width $W_{veh}$ of the vehicle 402 by the speed $V_{ped}$ of the pedestrian 606 in feet per second. Additionally, the length L of the vehicle space is related to the safety factor $S_f$ and the error $\epsilon$ of the positioning system. Equation 3 below shows the relationship between the length L of the vehicle space 602 and the related parameters.

$$L = S_f\left(\varepsilon + V_{veh}\cdot\frac{W_{veh}}{V_{ped}}\right) \quad (3)$$

It is worth noting that the length of the vehicle 402 can be ignored in determining the size of the vehicle box 402 because the speed of the vehicle 402 is much greater than the speed of the pedestrian 606. Thus, the entire length of the vehicle 402 passes the pedestrian quickly compared to the speed with which the pedestrian 606 is moving. For example, a vehicle that is 15 feet long and is moving at 50 miles per hour (mph), or 73.33 f/s, would pass a pedestrian's stationary position in 0.20 seconds. A pedestrian moving at 6 f/s that collides with the rear bumper of a vehicle moving at 50 mph would only be 1.8 feet from the vehicle's front bumper as it passed. A pedestrian moving at the same speed and colliding with the rear bumper of a vehicle moving at 25 mph would only be 3.6 feet from the vehicle's front bumper as it passed. These distances can easily be accounted for by increasing the safety factor $S_f$, thereby widening the vehicle space 602 so that pedestrians likely to collide with any portion of the vehicle 402 are predicted to be within the vehicle space 602.

Figure 17:
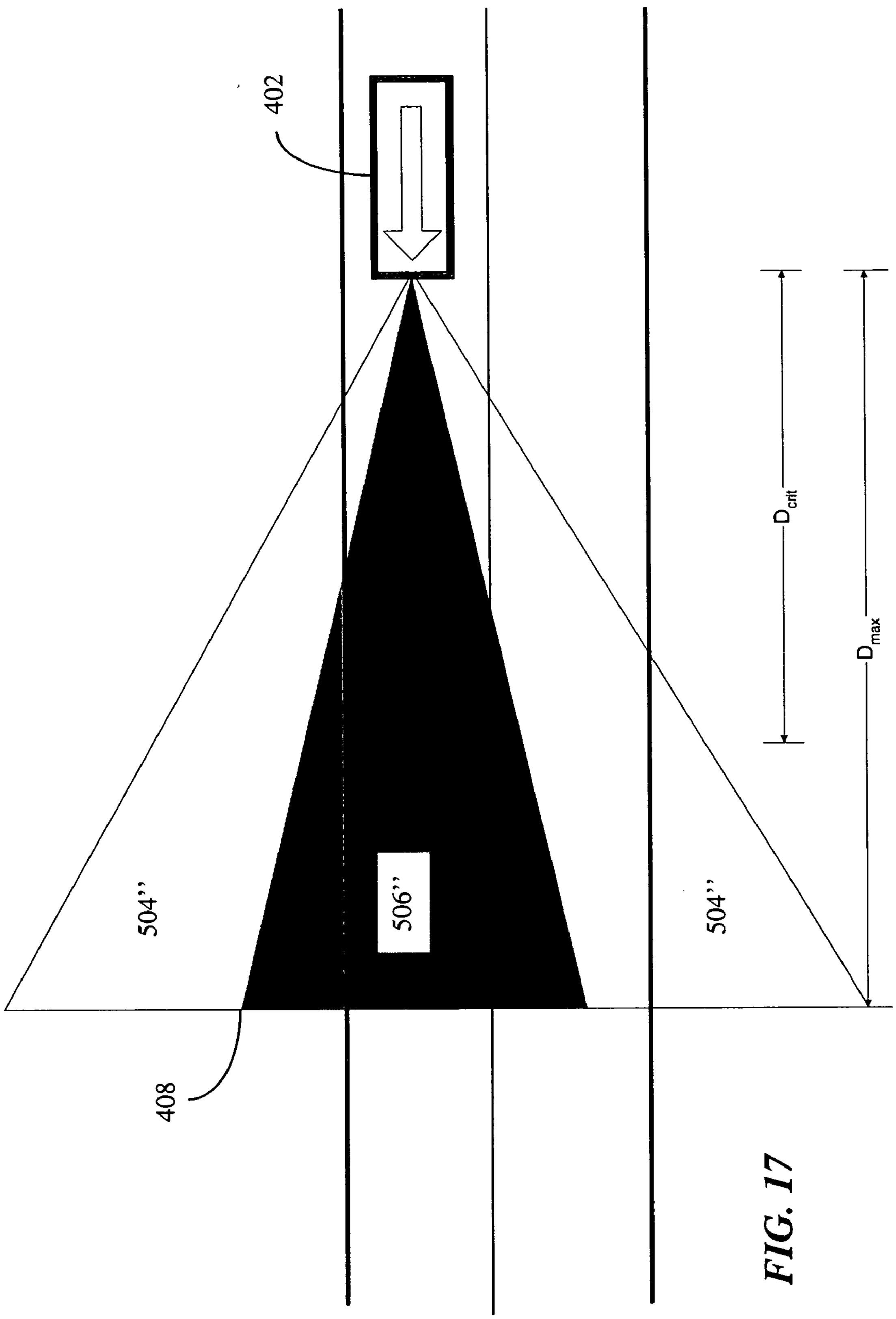
FIG. 17 is a diagram illustrating various aspects of an embodiment of the invention.

FIG. 17 is a diagram illustrating various aspects of an embodiment of the invention. In FIG. 17, a multi-tiered warning zone 408 extending from the front bumper of the vehicle 402 has a lower-level threat tier 504" and a higher-level threat tier 506". The vehicle is moving in the direction of the warning zone 408, as indicated by the arrow on the vehicle 402. The critical distance $D_{crit}$ is shown, as is the maximum distance $D_{max}$ in feet that is being monitored for potential collisions. Beyond the maximum distance $D_{max}$, the system of the invention does not warn of potential collisions because the possibility for error in predicting a collision is too great, or because it is not desired to alert the driver to events that would happen beyond some maximum time $T_{max}$ in seconds in the future, which corresponds to the position of the vehicle 402 beyond the maximum distance $D_{mas}$. The maximum distance $D_{max}$ can be calculated as shown below in Equation 4, using the maximum time $T_{max}$ and the speed of the vehicle $V_{veh}$.

$$D_{max}=T_{max}\cdot V_{veh} \quad (4)$$

Any pedestrians located in the higher-level threat tier 506" are possible threats of a collision within the maximum time $T_{max}$. Pedestrians within the higher-level threat tier 506" are closely monitored, and when they are within the critical distance $D_{crit}$ of the vehicle 402, the vehicle's driver is warned of the potential for collision. Pedestrians in the lower-level threat tier 504" are monitored closely, but no alert or warning is generated unless they move to within the higher-level threat tier 506". The second pedestrian 606 shown in FIG. 16, for example, is within the higher-level threat tier 506" and within the critical distance $D_{crit}$ from the vehicle 402, and would, therefore, generate a warning or alert.

The extent to which the higher-level threat tier 506" reaches laterally beyond the center of the vehicle's front bumper on either side can be determined by calculating the distance from which a pedestrian can reach the path of the vehicle 402 within the maximum time $T_{max}$. This can be determined dynamically, by sampling the speed $V_{veh}$ of the vehicle 402 and the speed $V_{ped}$ of the pedestrian, and multiplying the maximum time $T_{max}$ by the speed $V_{ped}$ of the pedestrian. Using dynamic adjustment, the warning zone 408 and the higher-level threat tier 506" would be different for each pedestrian traveling at a different speed, and would change with any changes of the speeds of pedestrians or the vehicle 402.

Alternatively, a constant approximation of pedestrian speed $V_{ped}$ can be used to calculate the lateral reach of the higher-level threat tier 506". For example, the pedestrian speed $V_{ped}$ of 4.5 f/s that is used to time crosswalk signals can be used. Alternatively, a more conservative value of pedestrian speed $V_{ped}$ of 8 f/s can be used in accordance with some embodiments of the invention to provide an additional margin of safety, and to account for unpredictable moves of children (e.g., darting in front of a moving vehicle). It should also be noted that a safety factor $S_f$ and an error estimate $\epsilon$ can also be used in generating the warning zone 408 to include an extra margin of safety.

Each of the measurements described above in connection with FIGS. 16 and 17 and Equations 1–4 can represent instantaneous measurements taken by the vehicular device 102 and/or the mobile devices 104. These instantaneous measurements can be measured at each time mark and may be constantly changing, thereby changing the calculated potential for collision and changing the alert status generated by the position of one or more devices. According to some embodiments of the invention, various averaging or smoothing algorithms can be employed for some measurements and calculations performed by the system on the instantaneous values. Additionally, predictive, forward-looking algorithms can be employed to use past data to determine the likelihood of future data.

From the foregoing, it can be seen that the invention provides a system and method for providing pedestrian alerts that make use of one or more mobile devices, and one or more vehicular devices. Specific embodiments have been described above in connection with the use of GPS or DGPS signals for determining location, speed, and/or heading of the various mobile devices and vehicular devices. The system and method described herein avoid disadvantages associated with prior approaches, as pedestrians that are visually screened from a motorist's view can easily be detected and tracked. Additionally, the system and method of the invention do not require an extensive or costly infrastructure, such as those commonly associated with prior approaches. Rather, the system and method of the invention require only vehicular devices carried by vehicles and mobile devices carried or worn by pedestrians.

It will be appreciated that the invention can be embodied in other specific forms without departing from the spirit or essential characteristics thereof. For example, while the invention has been described in the context of GPS signals, it will be recognized that other positioning or ranging signals can be used, which allow for similar operation using the principles of the invention. For example, in an urban setting, a series of imaging devices could be used in place of, or in addition to GPS signals to provide position, speed, and/or heading information of a plurality of pedestrians. Additionally, both the vehicular device and the mobile device can include other position and motion sensors, aside from those already described above. For example, each device can include an inertial measurement unit (IMU), such as a unit configured to measure angular and/or linear velocity, acceleration (i.e., an accelerometer), heading, roll, pitch, or other attitudinal or bearing changes.

It should be recognized that the mobile devices described herein, while providing great utility to most pedestrians, could become over-active when used by people required to work near a road and moving vehicles because of the generation of numerous alerts. For example, for a police officer directing traffic at an intersection, or a construction worker required to work near a busy road, constant alerts provided by the mobile device might be unnecessary or might become distracting when provided to motorists in the area of the pedestrian. Thus, according to some embodiments of the invention, the mobile device can include a bypass capability, allowing a pedestrian to temporarily deactivate the device, such that an activation signal from a vehicular device in a passing vehicle does not activate the mobile device, or provide an alert to either the motorist or the pedestrian. Of course, such bypass or temporary disablement capability would not be provided for users for whom it would likely be desirable to maintain the alert capability constantly activated, such as young children using the device. Thus, the mobile device can be made in several versions (e.g., an adult version and a child version), one form allowing disablement or deactivation, and another form not allowing disablement or deactivation for youthful users and others for whom deactivation of the device would be undesirable.

The invention can be used in connection with a variety of other complimentary technologies, such as the Intelligent Highway System (IHS), or other systems, and can interface with existing vehicle or infrastructure technologies. Thus, the present invention could form a novel part of a variety of alternative approaches, including existing and future approaches.

Although the mobile devices are frequently described herein in connection with their use by pedestrians, they can be used by other individuals, such as individuals using motorized or non-motorized vehicles (e.g., motorcycles, scooters, wheelchairs, Segway human transporters, skateboards, roller skates, bicycles, etc.), or by a variety of other individuals desiring the benefits of the system and method of the present invention.

The mobile devices can be stand-alone devices, or can be integrated into devices commonly used or worn by pedestrians or other users, such as key fob devices, items carried in a wallet (e.g., a smart card), and so forth. For example, the mobile devices can be configured as part of a wristwatch device, or can be integrated into hand-held or portable electronics, such as cell phones, personal digital assistants (PDAs), or other such devices. Additionally, the mobile devices can be attached to, or form part of various items of apparel. For example, an attachment to a zipper of a jacket or shirt can contain a mobile device. Similarly, mobile devices can be configured to fit within items of apparel, such as shoes, belts, eyeglasses, or any other suitable item for carrying a mobile device.

The presently disclosed embodiments are, therefore, considered in all respects to be illustrative and not restrictive. The scope of the invention is indicated by the appended claims, rather than the foregoing description, and all changes that come within the meaning and range of equivalents thereof are intended to be embraced therein.

What is claimed is:

1. A method, comprising:

transmitting an activation signal;

receiving a signal generated by a remotely located mobile transmitter in response to the activation signal;

determining a location of the remotely located mobile transmitter that has generated the received signal; and predicting, based on a set of pre-determined rules, whether the remotely located mobile transmitter is likely to come within a warning zone proximate to a first vehicle.

2. The method of claim 1, further comprising:

generating an alert if it is predicted that the remotely located mobile transmitter will approximately intersect a warning zone proximate to the first vehicle.

3. The method of claim 1, further comprising:

generating an alert if it is determined that the remotely located mobile transmitter is within a pre-determined warning zone proximate to the first vehicle.

4. The method of claim 1, further comprising:

generating an alert selected from a plurality of alerts if it is determined that the remotely located mobile transmitter is within one of a plurality of pre-determined warning zones proximate to the first vehicle, the generated alert being associated with the one of a plurality of pre-determined warning zones.

5. The method of claim 1, further comprising:

ascertaining the location of the first vehicle.

6. The method of claim 5, wherein the ascertaining is based on ranging signals received from at least one reference signal emitter.

7. The method of claim 5, wherein the ascertaining is based on global positioning system (GPS) data.

8. The method of claim 5, wherein the ascertaining is based on differential global positioning system (DGPS) data.

9. The method of claim 1, wherein the determining is based on ranging signals received from at least one reference signal emitter.

10. The method of claim 1, wherein the determining is based on global positioning system (GPS) data in the signal received from the remotely located mobile transmitter.

11. The method of claim 1, wherein the determining is based on differential global positioning system (DGPS) data in the signal received from the remotely located mobile transmitter.

12. The method of claim 1, wherein the predicting is at least partially based on the speed of the remotely located mobile transmitter.

13. The method of claim 1, wherein the predicting is at least partially based on the bearing of the remotely located mobile transmitter.

14. The method of claim 1, further comprising:
establishing at least one warning zone proximate to the first vehicle; and
varying the at least one warning zone based upon activity of the first vehicle.

15. The method of claim 14, wherein the varying varies the size of the at least one warning zone in response to a change in a velocity of the first vehicle.

16. The method of claim 14, wherein the varying varies the shape of the at least one warning zone in response to a change in a heading of the first vehicle.

17. The method of claim 14, wherein the varying varies the shape of the at least one warning zone in response to manipulation of a control within the first vehicle.

18. The method of claim 14, further comprising:
updating the at least one warning zone at regular intervals.

19. The method of claim 1, wherein the predicting includes:
calculating a heading based upon current and prior locations of all mobile transmitters from the at least one remotely located mobile transmitter.

20. The method of claim 1, wherein the determining includes mapping the location of the remotely located mobile transmitter and the first vehicle using a mapping component.

21. The method of claim 1, further comprising:
distinguishing between multiple received signals from a single mobile transmitter; and
selecting the most reliable signal of the multiple received signals.

22. The method of claim 1, wherein the warning zone is determined at least partially based on the location of the mobile transmitter relative to the first vehicle.

23. The method of claim 1, wherein the predicting is performed periodically at a frequency associated with motion of the first vehicle and the mobile transmitter.

24. An apparatus, comprising:
a transmitter configured to transmit an activation signal to a plurality of mobile transmitters located remotely from a mobile receiver;
the mobile receiver configured to receive electromagnetic signals from the plurality of mobile transmitters;
a processor configured to establish at least one warning zone proximate to the mobile receiver;
a warning zone analyzer configured to analyze the received electromagnetic signals and to determine a likelihood of any of the mobile transmitters from the plurality of mobile transmitters intersecting the at least one warning zone according to a set of pre-determined rules; and
a user interface configured to communicate information to a user based upon information determined by the processor.

25. The apparatus of claim 24, wherein the warning zone analyzer includes:
a processor configured to determine position and heading information for the plurality of mobile transmitters based upon the analyzed electromagnetic signals.

26. The apparatus of claim 24, wherein the user interface is configured to communicate a user alert when the information determined by the processor has a pre-determined alert characteristic.

27. The apparatus of claim 26, wherein the pre-determined alert characteristic includes the determined likelihood exceeding a pre-determined probability.

28. The apparatus of claim 24, wherein the processor configured to establish at least one warning zone is configured to vary characteristics of the at least one warning zone based upon a changing location of the mobile receiver.

29. The apparatus of claim 24, wherein the processor configured to establish at least one warning zone is configured to vary characteristics of the at least one warning zone based upon a changing speed of the mobile receiver.

30. The apparatus of claim 24, wherein the processor configured to establish at least one warning zone is configured to vary characteristics of the at least one warning zone based upon a changing direction of the mobile receiver.

31. The apparatus of claim 24, wherein the processor configured to establish at least one warning zone is configured to vary characteristics of the at least one warning zone based upon input from the user.

32. The apparatus of claim 24, further comprising:
a mapping component configured to provide geographical information regarding the location of the apparatus and any mobile transmitters from the at least one mobile transmitter.

33. The apparatus of claim 32, wherein the mapping component includes a position determining component configured to determine position based on ranging signals received from at least one reference signal emitter.

34. The apparatus of claim 32, wherein the mapping component includes a global positioning system (GPS) component.

35. The apparatus of claim 32, wherein the mapping component includes a differential global positioning system (DGPS) component.

36. The apparatus of claim 24, further comprising:
an inertial measurement unit (IMU) configured to determine inertial changes of the apparatus.

37. The apparatus of claim 24, wherein the warning zone analyzer is configured to determine the most reliable signal from a series of multi-path signals received from a single source.

38. The apparatus of claim 24, wherein the warning zone analyzer is configured to the highest priority signal from a plurality of received signals.

39. An apparatus, comprising:
means for transmitting an activation signal;
means for receiving a signal generated in response to an activation signal by a remotely located mobile transmitter;
means for determining a location of the remotely located mobile transmitter that has generated a signal; and
means for predicting, based on a set of pre-determined rules, whether the remotely located mobile transmitter is likely to come within a warning zone proximate to a vehicle.

40. An apparatus, comprising:
an activation component configured to receive an activation signal when positioned proximate to a warning zone proximate to a first vehicle, the apparatus configured to be activated in response to the received activation signal;

a portable variable power source capable of changing between an inactive state and an active state in response to the activation component activating the apparatus;

a receiver configured to receive signals including geopositional information while the apparatus is activated; and a transmitter configured to transmit information associated with the received geopositional information.

41. The apparatus of claim 40, wherein the portable variable power source is rechargeable.

42. The apparatus of claim 40, further comprising:

a processor configured to determine heading information of the apparatus and to communicate the determined heading information to the transmitter to be transmitted.

43. The apparatus of claim 40, further comprising:

a processor configured to determine speed information of the apparatus and to communicate the determined speed information to the transmitter to be transmitted.

44. The apparatus of claim 40, further comprising:

a means for attaching the apparatus to a user.

45. The apparatus of claim 40, wherein the transmitter is further configured to provide error correcting.

46. The apparatus of claim 40, further comprising:

means for determining inertial changes of the apparatus.

47. The apparatus of claim 46, wherein the means for determining inertial changes includes an inertial measurement unit (IMU).

48. A system, comprising:

a plurality of mobile devices, each of the plurality of mobile devices being configured to receive and transmit signals, including signals containing geopositional information;

a vehicular device configured to respectively transmit and receive information to and from each of the plurality of mobile devices including an activation signal to activate each of the plurality of mobile devices within an activation range, the vehicular device being configured to receive signals including geopositional information, the vehicular device being further configured to process signals received from each of the plurality of mobile devices within the activation range, determine the proximity of each of the plurality of mobile devices to the vehicular device, and provide information to a user, based on pre-determined rules, regarding the proximity of any of the plurality of mobile devices determined to be likely to intersect a warning zone of the vehicular device.

49. A method, comprising:

transmitting an activation signal from a vehicular device;

receiving the activation signal by at least one of a plurality of mobile devices;

activating the at least one of a plurality of mobile devices in response to the activation signal;

receiving geopositional information by the at least one of a plurality of mobile devices;

transmitting information associated with the received geopositional information from the at least one of a plurality of mobile devices to the vehicular device;

receiving the transmitted information by the vehicular device;

determining the location of the at least one of a plurality of mobile devices relative to the position of a vehicle associated with the vehicular device;

predicting the probability of the at least one of a plurality of mobile devices intersecting a warning zone proximate to the vehicle according to pre-determined prediction rules; and providing information to a user relating to the predicted probability based upon pre-determined user information rules.

* * * * *